(12) United States Patent
Kuwahara et al.

(10) Patent No.: US 9,779,308 B2
(45) Date of Patent: Oct. 3, 2017

(54) VIDEO MONITORING SYSTEM

(71) Applicant: PANASONIC INTELLECTUAL PROPERTY MANAGEMENT CO., LTD., Osaka (JP)

(72) Inventors: Marie Kuwahara, Fukuoka (JP); Sumio Yokomitsu, Fukuoka (JP); Jun Ikeda, Fukuoka (JP); Hiroyuki Ohno, Fukuoka (JP); Yasuo Yomogida, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 266 days.

(21) Appl. No.: 14/442,438

(22) PCT Filed: Nov. 11, 2013

(86) PCT No.: PCT/JP2013/006606
§ 371 (c)(1),
(2) Date: May 13, 2015

(87) PCT Pub. No.: WO2014/076920
PCT Pub. Date: May 22, 2014

(65) Prior Publication Data
US 2016/0275356 A1     Sep. 22, 2016

(30) Foreign Application Priority Data
Nov. 14, 2012   (JP) .................................. 2012-250145

(51) Int. Cl.
*H04N 7/18*     (2006.01)
*G06K 9/00*     (2006.01)
(Continued)

(52) U.S. Cl.
CPC ..... *G06K 9/00771* (2013.01); *G06K 9/00288* (2013.01); *G06K 9/00335* (2013.01);
(Continued)

(58) Field of Classification Search
CPC ............................ G06F 17/30; G06F 17/3079
(Continued)

(56) References Cited

U.S. PATENT DOCUMENTS 6,424,370 B1 *   7/2002   Courtney ............ G06F 17/3079
                                                         348/135
2005/0046699 A1   3/2005   Oya et al.
(Continued)

FOREIGN PATENT DOCUMENTS

CN          1694530 A      11/2005
CN        101093603 A      12/2007
(Continued)

OTHER PUBLICATIONS

Japanese Office Action, dated Dec. 8, 2015, for the corresponding Japanese Patent Application No. 2012-250145.
(Continued)

*Primary Examiner* — Andy Rao
(74) *Attorney, Agent, or Firm* — Greenblum & Bernstein, P.L.C.

(57) ABSTRACT

A video transmission apparatus detects a target object to be monitored from images obtained by imaging a monitoring area, tracks the detected target object, obtains existence time from appearance to disappearance of the target object, and transmits a data volume reduced image of the target object to a video reception apparatus. The video reception apparatus analyzes the data volume reduced image transmitted from the video transmission apparatus and transmits a video request of the target object to the video transmission apparatus) based on input made according to the result of the
(Continued)

analysis. When the video request transmitted from the video reception apparatus is received, the video transmission apparatus generates a monitoring video from the appearance to the disappearance of the target object based on the existence time of the target object and transmits the monitoring video to the video reception apparatus.

20 Claims, 15 Drawing Sheets

(51) Int. Cl.
*G08B 13/196* (2006.01)
*G06K 9/62* (2006.01)
*G06T 7/20* (2017.01)
*H04N 5/44* (2011.01)
*G06T 7/70* (2017.01)

(52) U.S. Cl.
CPC ..... *G06K 9/00751* (2013.01); *G06K 9/00832* (2013.01); *G06K 9/6267* (2013.01); *G06T 7/20* (2013.01); *G06T 7/70* (2017.01); *G08B 13/19608* (2013.01); *G08B 13/19613* (2013.01); *G08B 13/19669* (2013.01); *H04N 5/44* (2013.01); *H04N 7/18* (2013.01); *H04N 7/181* (2013.01); *H04N 7/188* (2013.01); *G06T 2207/30252* (2013.01); *G08B 13/196* (2013.01); *G08B 13/19667* (2013.01)

(58) Field of Classification Search
USPC .................................................. 348/142–160
See application file for complete search history.

(56) References Cited

U.S. PATENT DOCUMENTS

| | | |
|---|---|---|
| 2006/0239645 A1 | 10/2006 | Curtner et al. |
| 2010/0157049 A1 | 6/2010 | Dvir et al. |

FOREIGN PATENT DOCUMENTS

| | | |
|---|---|---|
| CN | 101808226 A | 8/2010 |
| EP | 0 967 584 | 12/1999 |
| JP | 2003-204541 A | 7/2003 |
| JP | 2004-064438 A | 2/2004 |
| JP | 2004-187115 | 7/2004 |
| JP | 2005-094443 A | 4/2005 |
| JP | 2005-323046 | 11/2005 |
| JP | 2006-093955 | 4/2006 |
| JP | 2007-329622 | 12/2007 |
| JP | 2009-157846 | 7/2009 |
| JP | 2009-252215 | 10/2009 |
| JP | 4622301 | 11/2010 |
| WO | 2006/106496 | 10/2006 |

OTHER PUBLICATIONS

International Search Report, dated Oct. 2, 2014, for the corresponding International Application No. PCT/JP2013/006606.
Japan Office Action, dated Jun. 6, 2017, for the corresponding Japanese Patent Application No. 2016-118064.
China Office Action and Search Report (with partial English language translation of China Office Action and English language translation of Search Report), dated May 3, 2017, for the corresponding Chinese Patent Application No. 201380058795.5.

\* cited by examiner

Fig.3
(a) 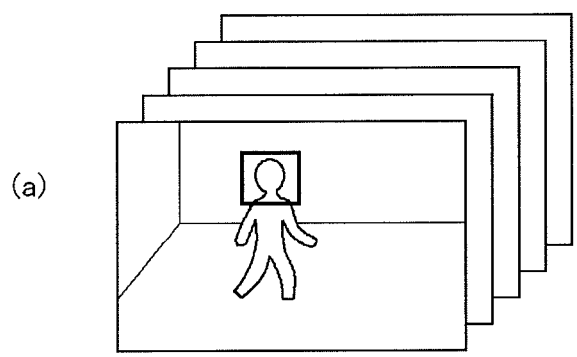
(b) 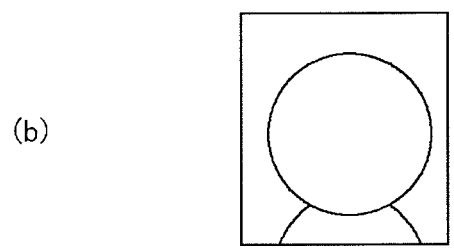

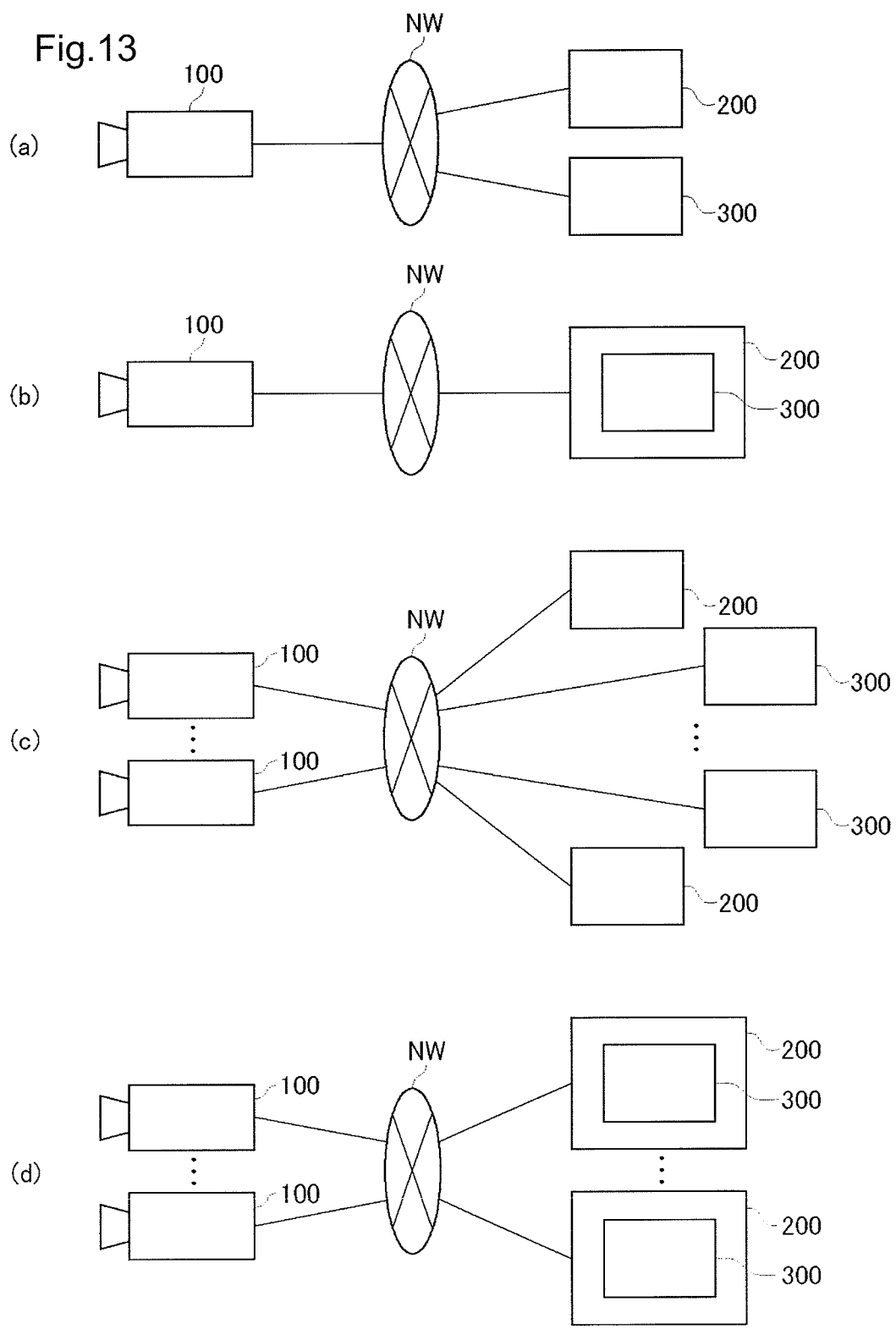

Fig.14

| | INFORMATION MANAGED BY VIDEO TRANSMISSION APPARATUS | INFORMATION TRANSMITTED FROM VIDEO TRANSMISSION APPARATUS TO VIDEO RECEPTION APPARATUS | INFORMATION REQUESTED TO VIDEO TRANSMISSION APPARATUS AT VIDEO REQUEST |
|---|---|---|---|
| 1 | DATA SET A | DATA SET A | DATA SET A |
| | | | DATA SET B |
| | | DATA SET B | DATA SET B |
| 2 | DATA SET B | DATA SET A | DATA SET A |
| | | DATA SET A+C | DATA SET A |
| | | | DATA SET C |
| 3 | DATA SET A+C | DATA SET B+D | DATA SET B |
| | | | DATA SET D |
| | ... | | |

Fig.15

(a) DATA SET A

| NO. | ID | TYPE | TIME INFORMATION | | |
|---|---|---|---|---|---|
| | | | APPEARANCE TIME | DISAPPEARANCE TIME | BEST-SHOT TIME |
| 1 | 0001 | PERSON (FACE) | 2012-07-01-00:00:00.000 | 2012-07-01-00:01:00.000 | 2012-07-01-00:00:50.000 |
| 2 | 0002 | PERSON (FACE) | 2012-07-01-00:02:00.000 | 2012-07-01-00:03:00.000 | 2012-07-01-00:02:40.000 |
| 3 | 0003 | PERSON (FACE) | 2012-07-01-00:02:00.000 | 2012-07-01-00:04:00.000 | 2012-07-01-00:03:30.000 |
| ... | | | | | |

(b) DATA SET B

| NO. | ID | TYPE |
|---|---|---|
| 1 | 0001 | PERSON (FACE) |
| 2 | 0002 | PERSON (FACE) |
| 3 | 0003 | PERSON (FACE) |
| ... | | |

(c) DATA SET C

| NO. | ID | TYPE OF ACTION OF INTEREST | TIME INFORMATION | |
|---|---|---|---|---|
| | | | START TIME OF ACTION OF INTEREST | END TIME OF ACTION OF INTEREST |
| 1 | 0001 | STAYING IN FRONT OF SHELF | 2012-07-01-00:00:30.000 | 2012-07-01-00:00:50.000 |
| 2 | 0001 | LOOKING AROUND (SUSPICION OF SHOPLIFTING) | 2012-07-01-00:00:40.000 | 2012-07-01-00:03:45.000 |
| 3 | 0003 | GOING AROUND (LOOKING FOR COMMODITY) | 2012-07-01-00:02:30.000 | 2012-07-01-00:03:30.000 |
| ... | | | | |

(d) DATA SET D

| NO. | ID | TYPE OF ACTION OF INTEREST |
|---|---|---|
| 1 | 0001 | STAYING IN FRONT OF SHELF |
| 2 | 0001 | LOOKING AROUND (SUSPICION OF SHOPLIFTING) |
| 3 | 0003 | GOING AROUND (LOOKING FOR COMMODITY) |
| ... | | |

VIDEO MONITORING SYSTEM

TECHNICAL FIELD

The present invention relates to a video monitoring system including a video transmission apparatus and a video reception apparatus connected through a network.

BACKGROUND ART

Conventionally, a video monitoring system including a video transmission apparatus and a video reception apparatus is proposed as a system that uses a video to monitor a monitoring area. In the video monitoring system, the video transmission apparatus is installed in the monitoring area, and the video reception apparatus is installed in a monitoring center, for example. The video transmission apparatus and the video reception apparatus are connected through a network, and the video transmission apparatus has a function of transmitting a video of a monitoring camera installed in the monitoring area to the video reception apparatus through the network. In the monitoring center, the video received by the video reception apparatus is used to monitor the monitoring area.

In the conventional video monitoring system, the video transmission apparatus records the video of the monitoring camera all the time. If a monitoring target (such as a face of a person) is detected from the video, the video transmission apparatus transmits images of the monitoring target (such as face images of the person) and time information to the video reception apparatus. When a video transmission request based on the time information is received from the video reception apparatus, the video transmission apparatus transmits a video of a certain time before and after the time designated by the time information to the video reception apparatus (for example, see Patent Literature 1). In this way, the transmission volume of the network is reduced, and the storage volume of the video reception apparatus is reduced.

However, the video of a certain time before and after the designated time is transmitted in the conventional video monitoring system. Therefore, even if the person to be monitored is in the video before the certain time before the designated time, such a necessary video is not transmitted. Even if the person to be monitored is not in the video any more before the certain time after the designated time, such an unnecessary video is transmitted.

CITATION LIST

Patent Literature

[Patent Literature 1] Japanese Patent No. 4622301

SUMMARY OF INVENTION

Technical Problem

The present invention has been made in view of the background. An object of the present invention is to provide a video monitoring system that can not only reduce the transmission volume of a network and reduce the storage volume of a video reception apparatus, but also can prevent a situation in which a necessary video is not transmitted and an unnecessary video is transmitted.

Solution to Problem

An aspect of the present invention provides a video monitoring system including a video transmission apparatus and a video reception apparatus. In the video monitoring system, the video transmission apparatus includes: an image input unit to which a plurality of consecutive images obtained by imaging a monitoring area are input; a target detection unit that detects a target object to be monitored from the plurality of images input to the image input unit; a target tracking unit that tracks the target object detected by the target detection unit to obtain existence time from appearance to disappearance of the target object in the monitoring area; a data volume reduction unit that selects an image, in which the target object is detected, from the plurality of images input to the image input unit and that reduces data volume of the selected image to generate a data volume reduced image of the target object; and an image transmission unit that transmits the data volume reduced image to the video reception apparatus, the video reception apparatus includes: an image reception unit that receives the data volume reduced image transmitted from the video transmission apparatus; a received information analysis unit that analyzes the data volume reduced image received by the data reception unit; and a request transmission unit that transmits a video request for requesting a plurality of consecutive images of the target object to the video transmission apparatus based on input made according to an analysis result of the received information analysis unit, and the video transmission apparatus further includes: an image storage unit that stores the plurality of images input to the image input unit; a request reception unit that receives the video request transmitted from the video reception apparatus; a monitoring video generation unit that generates a monitoring video of the target object including a plurality of consecutive images from the appearance to the disappearance of the target object based on the existence time of the target object when the request reception unit receives the video request; and a video transmission unit that transmits the monitoring video to the video reception apparatus.

As described below, the present invention includes other embodiments. Therefore, the disclosure of the invention is intended to provide part of the aspects of the present invention and is not intended to limit the scope of the invention described and claimed herein.

BRIEF DESCRIPTION OF DRAWINGS

FIGS. 3 (a) and (b) are explanatory diagrams of a method of generating a data volume reduced image (thumbnail image) according to the first embodiment of the present invention.

FIGS. 13 (a)-(d) are diagrams showing an example of a configuration of the video monitoring system.

FIG. 14 is a diagram showing an example of information handled in the video monitoring system.

FIGS. 15 (a)-(d) are diagrams showing an example of information handled in the video monitoring system.

DESCRIPTION OF EMBODIMENTS

Figure 1:
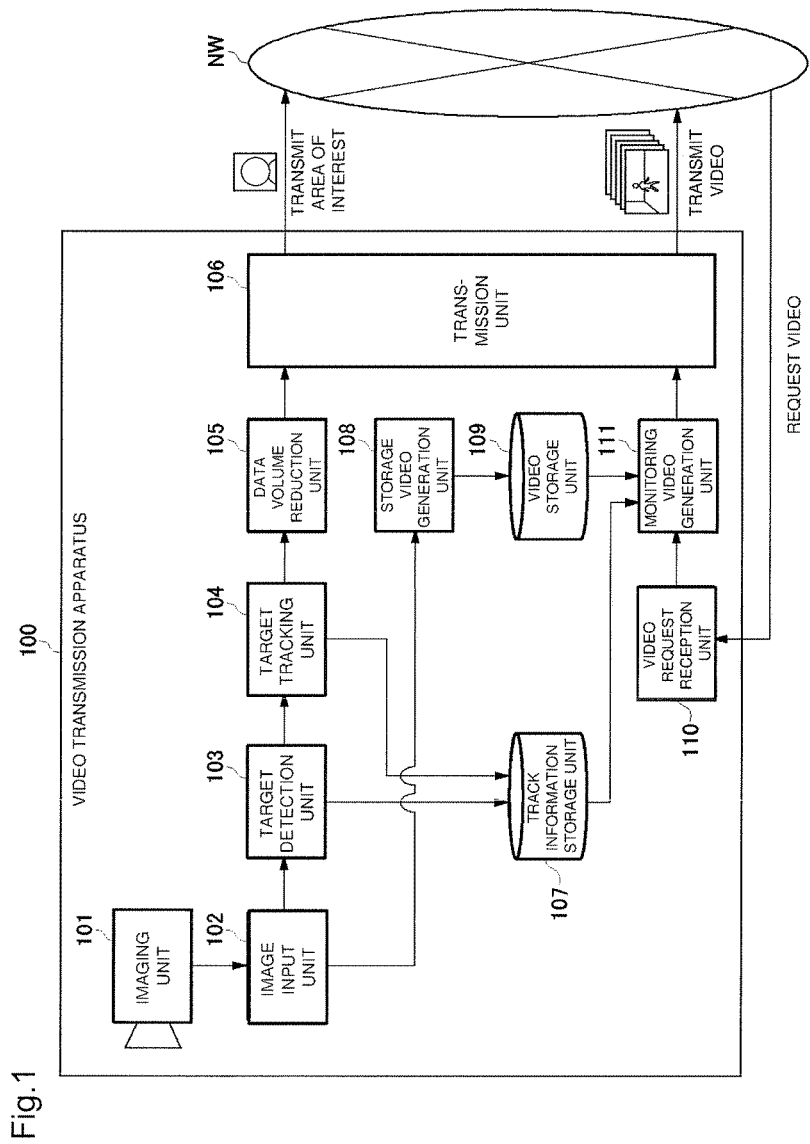
FIG. 1 is a block diagram of a video transmission apparatus of a video monitoring system according to a first embodiment of the present invention.

Hereinafter, detailed description of the present invention will be described. However, the following detailed description and the attached drawings do not limit the invention.

The present invention provides a video monitoring system including a video transmission apparatus and a video reception apparatus, the video transmission apparatus including: an image input unit to which a plurality of consecutive images obtained by imaging a monitoring area are input; a target detection unit that detects a target object to be monitored from the plurality of images input to the image input unit; a target tracking unit that tracks the target object detected by the target detection unit to obtain existence time from appearance to disappearance of the target object in the monitoring area; a data volume reduction unit that selects an image, in which the target object is detected, from the plurality of images input to the image input unit and that reduces data volume of the selected image to generate a data volume reduced image of the target object; and an image transmission unit that transmits the data volume reduced image to the video reception apparatus, the video reception apparatus including: an image reception unit that receives the data volume reduced image transmitted from the video transmission apparatus; a received information analysis unit that analyzes the data volume reduced image received by the data reception unit; and a request transmission unit that transmits a video request for requesting a plurality of consecutive images of the target object to the video transmission apparatus based on input made according to an analysis result of the received information analysis unit, the video transmission apparatus further including: an image storage unit that stores the plurality of images input to the image input unit; a request reception unit that receives the video request transmitted from the video reception apparatus; a monitoring video generation unit that generates a monitoring video of the target object including a plurality of consecutive images from the appearance to the disappearance of the target object based on the existence time of the target object when the request reception unit receives the video request; and a video transmission unit that transmits the monitoring video to the video reception apparatus.

According to the configuration, when a plurality of consecutive images obtained by imaging a monitoring area are input to the video transmission apparatus, the target object to be monitored is detected from the plurality of images. In this case, the video transmission apparatus tracks the target object to obtain the existence time from the appearance to the disappearance of the target object. The video transmission apparatus selects one or a plurality of images, in which the target object is detected, and reduces the data volume. The video transmission apparatus generates a data volume reduced image (for example, thumbnail image) of the target object and transmits the data volume reduced image to the video reception apparatus. The video reception apparatus analyzes the data volume reduced image of the target object. When a video request of the target object is transmitted to the video transmission apparatus according to the analysis result (for example, when the user wants to check the video in detail or when the video reception apparatus or the display apparatus determines to use and analyze a detailed video), the video transmission apparatus generates a monitoring video of the target object (a plurality of consecutive images from the appearance to the disappearance of the target object) based on the existence time of the target object and transmits the monitoring video to the video reception apparatus. According to the present invention, the video transmission apparatus first transmits the data volume reduced image to the video reception apparatus and transmits the monitored video of the target object only when the video request is made according to the analysis result of the data volume reduced image. This can reduce the transmission volume of the network and reduce the storage volume of the video reception apparatus. In this case, the monitoring video is a video (a plurality of consecutive images) from the appearance to the disappearance of the target object, and a situation in which a necessary video is not transmitted and an unnecessary video is transmitted can be prevented.

In the video monitoring system of the present invention, the video transmission apparatus may further include an action analysis unit that analyzes an action of the target object from the plurality of images input to the image input unit to obtain monitoring action time from a start to an end of the action, and when an action to be monitored is designated in the video reception apparatus, the monitoring video generation unit may generate, as the monitoring video, a video including a plurality of consecutive images from the start to the end of the action of the target object to be monitored based on the monitoring action time.

According to the configuration, when an action to be monitored (for example, suspicion of shoplifting) is designated in the video reception apparatus, the video transmission apparatus detects the action of the target object to be monitored and obtains the monitoring action time from the start to the end of the action to be monitored. The video transmission apparatus generates the monitoring video of the target object (a plurality of consecutive images from the start to the end of the action to be monitored) based on the monitoring action time and transmits the monitoring video to the video reception apparatus. As a result, only the monitoring video related to the action to be monitored can be easily checked.

In the video monitoring system of the present invention, a plurality of the video transmission apparatuses may be installed in one monitoring area, images obtained by imaging the monitoring area from different positions may be input to the plurality of video transmission apparatuses, and the video reception apparatus may further include: a target object checking unit that analyzes a plurality of the data volume reduced images received from the plurality of video transmission apparatuses to check whether the target objects of the plurality of data volume reduced images are a same person; and a best-shot determination unit that selects a best-shot image from the plurality of data volume reduced images when the target objects are determined to be the same person as a result of the check by the target object checking unit.

According to the configuration, a plurality of video transmission apparatuses are installed in one monitoring area, and images obtained by imaging the monitoring area are input to the plurality of video transmission apparatuses. The video reception apparatus analyzes a plurality of data volume reduced images received from the plurality of video transmission apparatuses and checks whether the target objects of the data volume reduced images are the same person. When the target objects are determined to be the same person as a result of the check, the video reception apparatus selects the best-shot image from the plurality of data volume reduced images. As a result, when a plurality of video transmission apparatuses are installed in one monitoring area, the best-shot image can be used to comprehensively manage the target object appeared in the monitoring area.

In the video monitoring system of the present invention, the monitoring area may include an exit/entrance area of a shop, a plurality of the video transmission apparatuses may be installed to monitor the exit/entrance area of the shop, the plurality of video transmission apparatuses may include a first video transmission apparatus installed at a position that allows imaging a person entering the shop and a second video transmission apparatus installed at a position that allows imaging a person leaving the shop, the target object to be monitored by the first video transmission apparatus may be the person entering the shop, the target object to be monitored by the second video transmission apparatus may be the person leaving the shop, the video reception apparatus may further include: an appearance time reception unit that receives appearance time of the target object of the first video transmission apparatus from the first video transmission apparatus; a disappearance time reception unit that receives disappearance time of the target object of the second video transmission apparatus from the second video transmission apparatus; and a target object checking unit that analyzes the data volume reduced images received from the first video transmission apparatus and the second video transmission apparatus to check whether the target object of the first video transmission apparatus and the target object of the second video transmission apparatus are a same person, and the received information analysis unit may obtain, as shop stay time of the target object, time from the appearance time of the target object of the first video transmission apparatus to the disappearance time of the target object of the second video transmission apparatus when the target objects are determined to be the same person as a result of the check by the target object checking unit.

According to the configuration, an exit/entrance area of a shop can be monitored. In this case, the first video transmission apparatus is installed at a position that allows imaging a person entering the shop, and the second video transmission apparatus is installed at a position that allows imaging a person leaving the shop. Whether the target object of the first video transmission apparatus and the target object of the second video transmission apparatus are the same person is checked. When the target objects are determined to be the same person, the time from the appearance time of the target object of the first video transmission apparatus to the disappearance time of the target object of the second video transmission apparatus is obtained as the shop stay time of the target object. In this way, the shop stay time of the target object (customer) can be obtained.

In the video monitoring system of the present invention, the monitoring area may include a shop area, a plurality of the video transmission apparatuses may be installed to monitor an exit/entrance area of the shop, the plurality of video transmission apparatuses may include a first video transmission apparatus installed at a position that allows imaging an entrance point of the shop and a second video transmission apparatus installed at a position that allows imaging an ordering point of the shop, the target object to be monitored by the first video transmission apparatus and the second video transmission apparatus may be a person entering the shop, the video reception apparatus may further include: an appearance time reception unit that receives appearance time of the target object from the first video transmission apparatus; a disappearance time reception unit that receives disappearance time of the target object from the second video transmission apparatus; and a target object checking unit that analyzes the data volume reduced images received from the first video transmission apparatus and the second video transmission apparatus to check whether the target object of the first video transmission apparatus and the target object of the second video transmission apparatus are a same person, and the received information analysis unit may obtain, as time from entering the shop area to ordering, time from the appearance time of the target object of the first video transmission apparatus to the disappearance time of the target object of the second video transmission apparatus when the target objects are determined to be the same person as a result of the check by the target object checking unit.

According to the configuration, a shop area (for example, inside of a convenience store or a drive-through shop area) can be monitored. In this case, the first video transmission apparatus is installed at a position that allows imaging an entrance point of the shop, and the second video transmission apparatus is installed at a position that allows imaging an ordering point of the shop (for example, a cash register of a convenience store or an ordering area of a drive-through). Whether the target object of the first video transmission apparatus and the target object of the second video transmission apparatus are the same person is checked. When the target objects are determined to be the same person, the time from the appearance time of the target object of the first video transmission apparatus to the disappearance time of the target object of the second video transmission apparatus is obtained as the time from entering the shop area to ordering. In this way, the time from entering the shop area to ordering can be obtained.

In the video monitoring system of the present invention, the monitoring area may include a drive-through shop area, a plurality of the video transmission apparatuses may be installed to monitor the drive-through shop area, the plurality of video transmission apparatuses may include a first video transmission apparatus installed at a position that allows imaging an entrance point in the shop area, a second video transmission apparatus installed at a position that allows imaging an ordering point in the shop area, and a third video transmission apparatus installed at a position that allows imaging a delivery point in the shop area, the target object to be monitored by the first video transmission apparatus, the second video transmission apparatus, and the third video transmission apparatus may be a vehicle or a driver of the vehicle passing through the shop area, the video reception apparatus may further include: an appearance time reception unit that receives appearance time of the target object from the first video transmission apparatus and the second video transmission apparatus; a disappearance time reception unit that receives disappearance time of the target object from the second video transmission apparatus and the third video transmission apparatus; and a target object checking unit that analyzes the data volume reduced images received from the first video transmission apparatus, the second video transmission apparatus, and the third video transmission apparatus to check whether the target object of the first video transmission apparatus, the target object of the second video transmission apparatus, and the target object of the third video transmission apparatus are a same vehicle or a same person, and the received information analysis unit may obtain, as time from entering the shop area to ordering, time from the appearance time of the target object of the first video transmission apparatus to the disappearance time of the target object of the second video transmission apparatus and may obtain, as time from ordering to delivery in the shop area, time from the appearance time of the target object of the second video transmission apparatus to the disappearance time of the target object of the third video transmission apparatus when the target objects are determined to be the same vehicle or the same person as a result of the check by the target object checking unit.

According to the configuration, a drive-through shop area can be monitored. In this case, the first video transmission apparatus is installed at a position that allows imaging an entrance point in the shop area. The second video transmission apparatus is installed at a position that allows imaging an ordering point in the shop area. The third video transmission apparatus is installed at a position that allows imaging a delivery point in the shop area. Whether the target object of the first video transmission apparatus, the target object of the second video transmission apparatus, and the target object of the third video transmission apparatus are the same vehicle or the same person is checked. When the target objects are determined to be the same vehicle or the same person, the time from the appearance time of the target object of the first video transmission apparatus to the disappearance time of the target object of the second video transmission apparatus is obtained as the time from entering the shop area to ordering, and the time from the appearance time of the target object of the second video transmission apparatus to the disappearance time of the target object of the third video transmission apparatus is obtained as the time from ordering to delivery in the shop area. In this way, the time from entering the drive-through shop area to ordering and the time from ordering to delivery can be obtained.

In the video monitoring system of the present invention, the monitoring area may include a drive-through shop area, a plurality of the video transmission apparatuses may be installed to monitor the drive-through shop area, the plurality of video transmission apparatuses may include a second video transmission apparatus installed at a position that allows imaging an ordering point in the shop area and a third video transmission apparatus installed at a position that allows imaging a delivery point in the shop area, the target object to be monitored by the second video transmission apparatus and the third video transmission apparatus may be a vehicle or a driver of the vehicle passing through the shop area, the video reception apparatus may further include: an appearance time reception unit that receives appearance time of the target object from the second video transmission apparatus; a disappearance time reception unit that receives disappearance time of the target object from the third video transmission apparatus; and a target object checking unit that analyzes the data volume reduced images received from the second video transmission apparatus and the third video transmission apparatus to check whether the target object of the second video transmission apparatus and the target object of the third video transmission apparatus are a same vehicle or a same person, and the received information analysis unit may obtain, as time from ordering to delivery in the shop area, time from the appearance time of the target object of the second video transmission apparatus to the disappearance time of the target object of the third video transmission apparatus when the target objects are determined to be the same vehicle or the same person as a result of the check by the target object checking unit.

According to the configuration, a drive-through shop area can be monitored. In this case, the second video transmission apparatus is installed at a position that allows imaging an ordering point in the shop area, and the third video transmission apparatus is installed at a position that allows imaging a delivery point in the shop area. Whether the target object of the second video transmission apparatus and the target object of the third video transmission apparatus are the same vehicle or the same person is checked. When the target objects are determined to be the same vehicle or the same person, the time from the appearance time of the target object of the second video transmission apparatus to the disappearance time of the target object of the third video transmission apparatus is obtained as the time from ordering to delivery in the shop area. In this way, the time from ordering to delivery in the drive-through shop area can be obtained.

The present invention provides a video monitoring method executed in a video monitoring system including a video transmission apparatus and a video reception apparatus, wherein when a plurality of consecutive images obtained by imaging a monitoring area are input, the video transmission apparatus detects a target object to be monitored from the plurality of input images, tracks the detected target object to obtain existence time from appearance to disappearance of the target object in the monitoring area, selects an image, in which the target object is detected, from the plurality of input images, reduces data volume of the selected image to generate a data volume reduced image of the target object, and transmits the data volume reduced image to the video reception apparatus. When the data volume reduced image transmitted from the video transmission apparatus is received, the video reception apparatus analyzes the received data volume reduced image and transmits a video request for requesting a plurality of consecutive images of the target object to the video transmission apparatus based on input made according to an analysis result. The video transmission apparatus further stores the plurality of images input to the image input unit. When the video request transmitted from the video reception apparatus is received, the video transmission apparatus generates a monitoring video of the target object including a plurality of consecutive images from the appearance to the disappearance of the target object based on the existence time of the target object and transmits the monitoring video to the video reception apparatus.

The present invention provides a video transmission apparatus connected to a video reception apparatus in a video monitoring system, the video transmission apparatus including: an image input unit to which a plurality of consecutive images obtained by imaging a monitoring area are input; a target detection unit that detects a target object to be monitored from the plurality of images input to the image input unit; a target tracking unit that tracks the target object detected by the target detection unit to obtain existence time from appearance to disappearance of the target object in the monitoring area; a request reception unit that receives a video request transmitted from the video reception apparatus; a monitoring video generation unit that generates a monitoring video of the target object including a plurality of consecutive images from the appearance to the disappearance of the target object based on the existence time of the target object when the request reception unit receives the video request; and a video transmission unit that transmits the monitoring video to the video reception apparatus.

The present invention provides a program executed by a video transmission apparatus connected to a video reception apparatus in a video monitoring system, the program causing a computer to execute: a process in which a plurality of consecutive images obtained by imaging a monitoring area are input; a process of detecting a target object to be monitored from the plurality of images input to the image input unit; a process of tracking the target object detected by the target detection unit to obtain existence time from appearance to disappearance of the target object in the monitoring area; a process of receiving a video request transmitted from the video reception apparatus; a process of generating a monitoring video of the target object including a plurality of consecutive images from the appearance to the disappearance of the target object based on the existence time of the target object when the request reception unit receives the video request; and a process of transmitting the monitoring video to the video reception apparatus.

The present invention provides a video reception apparatus connected to a video transmission apparatus in a video monitoring system, the video reception apparatus including: an image reception unit that receives an image, in which a target object is detected, transmitted from the video transmission apparatus; an image analysis unit that analyzes the image received by the data reception unit; and a request transmission unit that transmits a video request for requesting a plurality of consecutive images of the target object to the video transmission apparatus based on input made according to an analysis result of the image analysis unit.

The present invention provides a program executed by a video reception apparatus connected to a video transmission apparatus in a video monitoring system, the program causing a computer to execute: a process of receiving an image, in which a target object is detected, transmitted from the video transmission apparatus; a process of analyzing the image received by the data reception unit; and a process of transmitting a video request for requesting a plurality of consecutive images of the target object to the video transmission apparatus based on input made according to an analysis result of the image analysis unit.

According to the video monitoring method, the video transmission apparatus, the video reception apparatus, and the program, the video transmission apparatus first transmits the data volume reduced image to the video reception apparatus and transmits the monitoring video of the target object only when a video request is made according to the analysis result of the data volume reduced image, as in the video monitoring system. This can reduce the transmission volume of the network and reduce the storage volume of the video reception apparatus. Since the data volume received by the video reception apparatus can be reduced, one video reception apparatus can receive videos of a large number of video transmission apparatuses. In this case, the monitoring video is a video (a plurality of consecutive images) from the appearance to the disappearance of the target object, and a situation in which a necessary video is not transmitted and an unnecessary video is transmitted can be prevented.

The present invention can not only reduce the transmission volume of a network and reduce the storage volume of a video reception apparatus, but also can prevent a situation in which a necessary video is not transmitted and an unnecessary video is transmitted.

Hereinafter, a video monitoring system according to embodiments of the present invention will be described with reference to the drawings. The embodiments illustrate a video monitoring system that uses a video to monitor a monitoring area, such as a facility and a building.

First Embodiment

A video monitoring system of the present embodiment includes a video transmission apparatus and a video reception apparatus. The video transmission apparatus is installed in a monitoring area, and the video reception apparatus is installed in a monitoring center. The video transmission apparatus and the video reception apparatus are connected through a network. The video transmission apparatus transmits a video of a monitoring camera installed in the monitoring area to the video reception apparatus through the network. In the monitoring center, the video received by the video reception apparatus is used to monitor the monitoring area. Programs mounted on the video transmission apparatus and the video reception apparatus can realize various functions (described later) included in the video transmission apparatus and the video reception apparatus.

Figure 2:
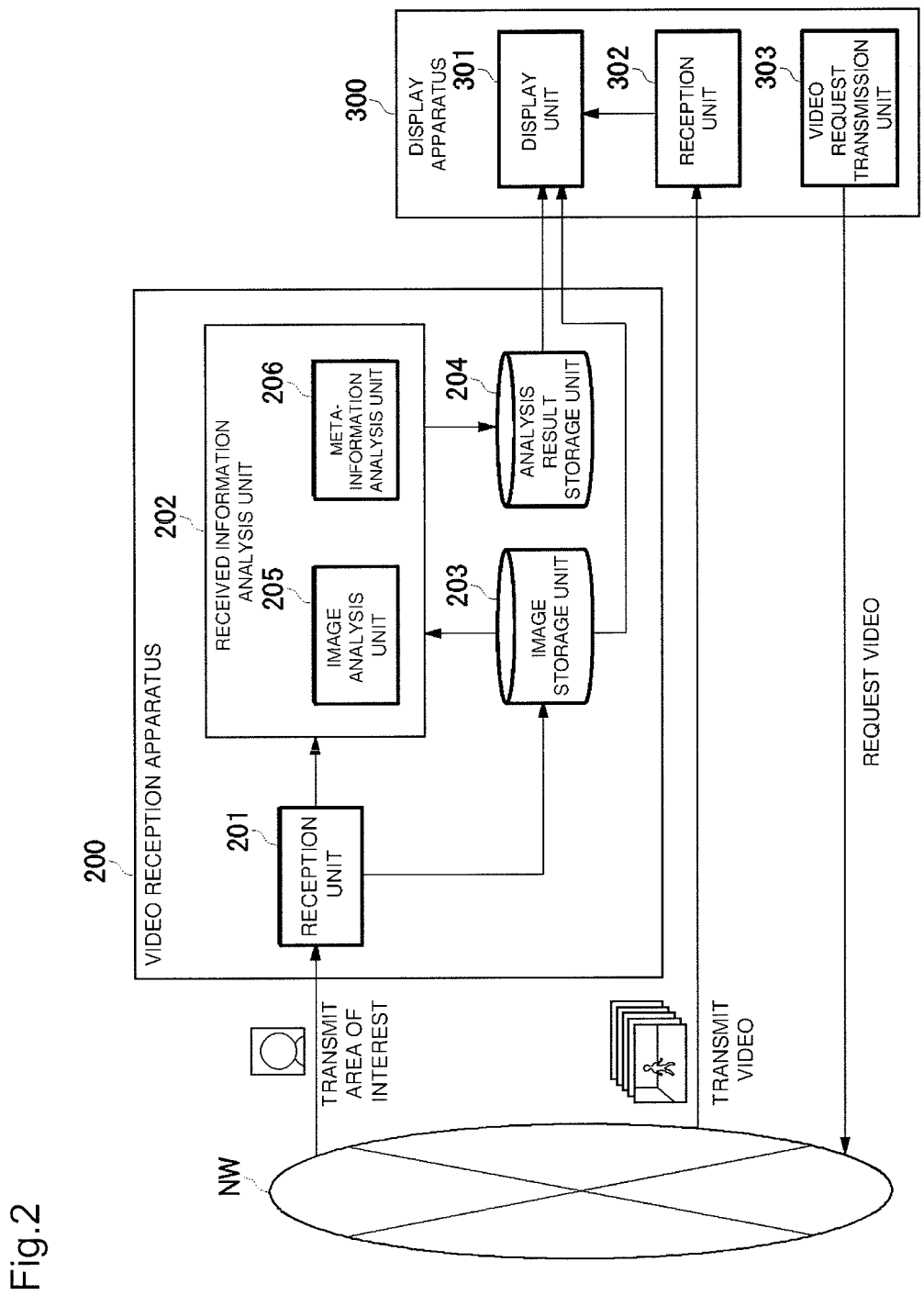
FIG. 2 is a block diagram of a video reception apparatus of the video monitoring system according to the first embodiment of the present invention.

Hereinafter, a configuration of the video monitoring system according to a first embodiment of the present invention will be described with reference to the drawings. FIG. 1 is a block diagram showing a configuration of the video transmission apparatus according to the present embodiment, and FIG. 2 is a block diagram showing a configuration of the video reception apparatus according to the present embodiment.

The configuration of the video transmission apparatus will be described first here with reference to FIG. 1. As shown in FIG. 1, a video transmission apparatus 100 includes an imaging unit 101, an image input unit 102, a target detection unit 103, a target tracking unit 104, a data volume reduction unit 105, and a transmission unit 106.

The imaging unit 101 has camera functions (for example, a lens, an aperture, an imaging element, and a signal processing circuit). The imaging unit 101 images a monitoring area to generate consecutive images. For example, the imaging unit 101 generates consecutive images of the monitoring area (for example, moving images of 30 frames per second). The imaging unit 101 outputs the generated images to the image input unit 102.

The images output from the imaging unit 101 are consecutively input to the image input unit 102. More specifically, a plurality of consecutive images obtained by imaging the monitoring area are input to the image input unit 102.

The target detection unit 103 analyzes the images input to the image input unit 102 to detect a target object to be monitored (also simply referred to as "target"). Examples of the target include the face of a person, the number plate of a vehicle, clothes, and shoes. A specific target may be designated by user input. A known technique (for example, see Japanese Patent No. 4318465 and Japanese Patent No. 3930504) can be used to detect the target.

The target tracking unit 104 tracks the target detected by the target detection unit 103 and links the same target in the time-series direction. The target tracking unit 104 obtains existence time from the appearance to the disappearance of the target (for example, appearance: X hours, X minutes, X seconds, disappearance: Y hours, Y minutes, Y seconds). A known technique (for example, see Japanese Patent Laid-Open No. 2004-310281, Japanese Patent No. 3930504, and Japanese Patent No. 4578864) can be used to track the target.

The data volume reduction unit 105 selects one or a plurality of images, in which the target object is detected, from the plurality of images input to the image input unit 102. The data volume reduction unit 105 reduces the data volume of the selected images to generate data volume reduced images of the target object. The data volume reduction unit 105 selects one or a plurality of images from the plurality of consecutive images and reduces the data volume of the selected images to thereby reduce the data volume of the images transmitted from the video transmission apparatus 100 to the video reception apparatus 200. More specifically, the data volume reduction unit 105 transmits only best-shot images to the video reception apparatus 200 (reduce the number of transmitted images), instead of all of the plurality of input images, to reduce the data volume of the images transmitted from the video transmission apparatus 100 to the video reception apparatus 200. As for the images to be transmitted, the video transmission apparatus 100 also reduces the data volume of the images and transmits the images to the video reception apparatus 200. In this way, the data volume of the images transmitted from the video transmission apparatus 100 to the video reception apparatus 200 is reduced. The data volume recued images may be obtained by trimming, resizing, and encoding the images to reduce the data volume. The data volume reduced images are images of an area of interest of the target object (such as a face area of a person) and are, for example, thumbnail images of the area of interest.

A method of generating the data volume reduced image (thumbnail image) will be described with reference to FIG. 3. FIG. 3(a) is a diagram showing a plurality of images consecutively input from the imaging unit 101 to the image input unit 102, and FIG. 3(b) is a diagram showing a data volume reduced image. As shown in FIG. 3(a), the data volume reduction unit 105 selects one or a plurality of images from the plurality of images input to the image input unit 102 and trims or resizes the selected image (illustrated by a thick frame in FIG. 3(a)) to thereby reduce the data volume of the selected image to generate a thumbnail image (data volume reduced image) of the area of interest (see FIG. 3(b)).

The transmission unit 106 transmits the image (data volume reduced image) generated by the data volume reduction unit 105 and attached information (meta-information) related to the image to the video reception apparatus 200 through a network NW. As described, the images transmitted from the transmission unit 106 to the video reception apparatus 200 are images (data volume reduced images) obtained by selecting one or a plurality of selection images from the plurality images consecutively input from the imaging unit 101 to the image input unit 102 and then trimming, resizing, and encoding the selection images to reduce the data volume. Therefore, the data volume of the images transmitted from the video transmission apparatus 100 to the video reception apparatus 200 can be reduced. The load of the network NW, the processing load of the video reception apparatus 200, and the required volume of a database can be reduced.

Next, a configuration of the video reception apparatus 200 will be described with reference to FIG. 2. As shown in FIG. 2, the video reception apparatus 200 includes a reception unit 201, a received information analysis unit 202, an image storage unit 203, and an analysis result storage unit 204. The video reception apparatus 200 further includes a display apparatus 300, and the display apparatus 300 includes a display unit 301, a reception unit 302, and a video request transmission unit 303.

The reception unit 201 of the video reception apparatus 200 receives the data volume reduced images transmitted from the video transmission apparatus 100 and attached information (meta-information) of the images. The received data volume reduced images are stored in the image storage unit 203. The received information analysis unit 202 includes an image analysis unit 205 and a meta-information analysis unit 206. The image analysis unit 205 analyzes the data volume reduced images received by the reception unit 201, and the meta-information analysis unit 206 analyzes the attached information of the images. In this way, the images and the attached information are analyzed to execute a recognition authentication process of the target. Examples of the recognition authentication process include recognition of age and sex from the face of a person, authentication of a specific person from the face of the person (comparison with a blacklist of shoplifters), and recognition of the number plate of a vehicle. The result of the analysis (result of the recognition authentication process) is stored in the analysis result storage unit 204.

The display unit 301 of the display apparatus 300 displays the data volume reduced images stored in the image storage unit 203 and the analysis result stored in the analysis result storage unit 204. The user views the data volume reduced images and the analysis result of the target object, and if the user wants to see the monitoring video of the target object in detail (such as a video of the whole body and a video of actions), the user performs user input for requesting the video of the target object. Based on the user input, the request transmission unit transmits a video request for requesting the video of the target object (a plurality of consecutive images of the target object) to the video transmission apparatus 100. The reception unit 302 of the display apparatus 300 receives the video (monitoring video described later) transmitted from the video transmission apparatus 100 according to the video request. The display unit 301 displays the received monitoring video.

The description of the video transmission apparatus 100 will be continued with reference again to FIG. 1. As shown in FIG. 1, the video transmission apparatus 100 includes a track information storage unit 107, a video generation unit 108, a video storage unit 109, a video request reception unit 110, and a monitoring video generation unit 111.

The track information storage unit 107 stores the information of the target object detected by the target detection unit 103 and the information of the existence time of the target object obtained by the target tracking unit 104. The video generation unit 108 generates images to be stored in the video storage unit 109 from the images input to the image input unit 102. The video storage unit 109 stores the images generated by the video generation unit 108.

The video request reception unit 110 receives the video request transmitted from the video reception apparatus 200. Consequently, the monitoring video generation unit 111 generates a monitoring video of the target object (video including a plurality of consecutive images from the appearance to the disappearance of the target object) based on the information stored in the track information storage unit 107 (information of the target object and information of the existence time of the target object) and based on the images stored in the video storage unit 109. The transmission unit 106 transmits the generated monitoring video to the video reception apparatus 200.

Figure 4:
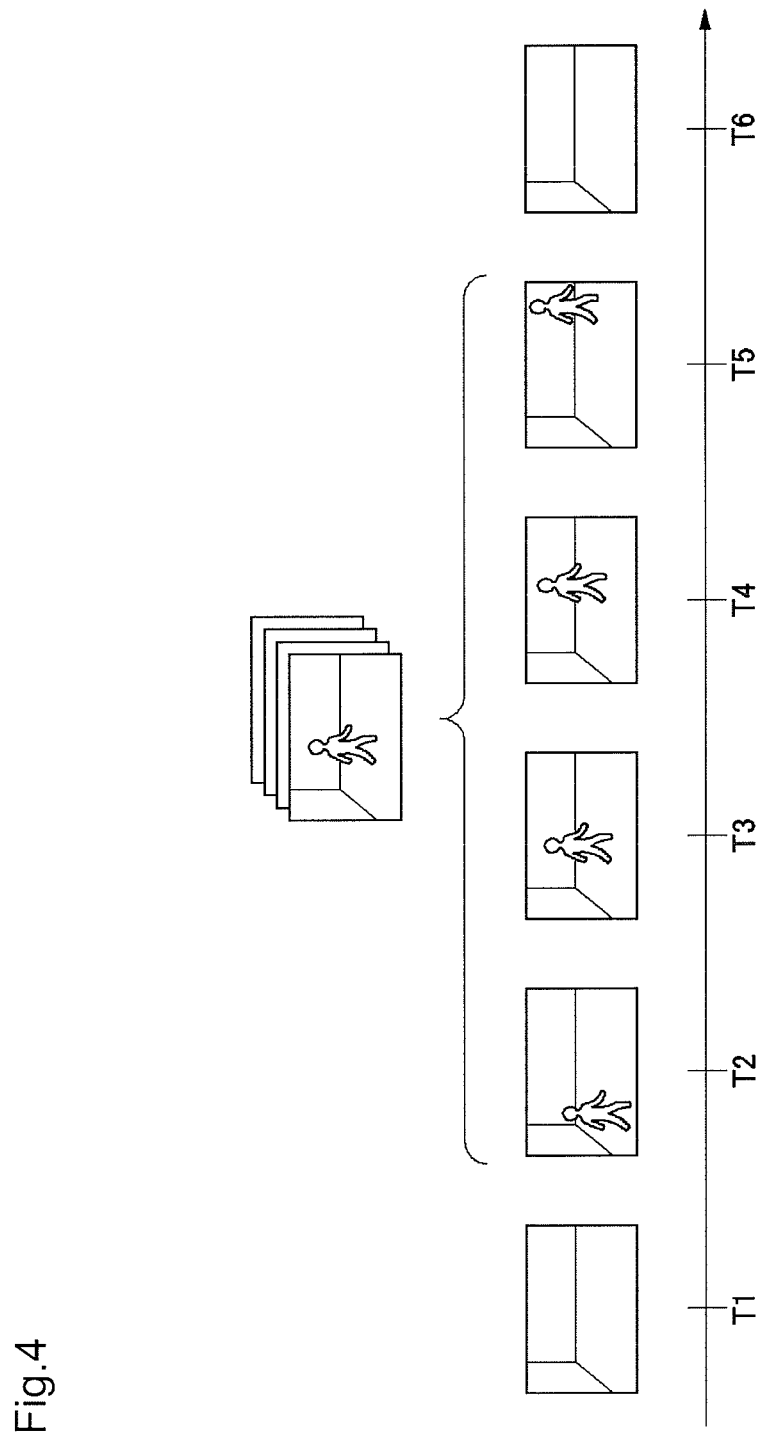
FIG. 4 is an explanatory diagram of a method of generating a monitoring video according to the first embodiment of the present invention.

A method of generating the monitoring video will be described with reference to FIG. 4. As shown in FIG. 4, for example, images of the monitoring area from time T1 to time T6 (a plurality of consecutive images) are stored in the video storage unit 109. Among the images, it is assumed that the target object to be monitored is imaged only between the time T2 and the time T5. In this case, the information of the existence time stored in the track information storage unit 107 indicates "time T2: appearance, time T5: disappearance". Based on the information of the existence time, the monitoring video generation unit 111 selects the images of the monitoring area from the time T2 to the time T5 among the images stored in the video storage unit 109 to generate a monitoring video.

Operation of the video monitoring system with the configuration described above will be described with reference to the drawings.

Figure 5:
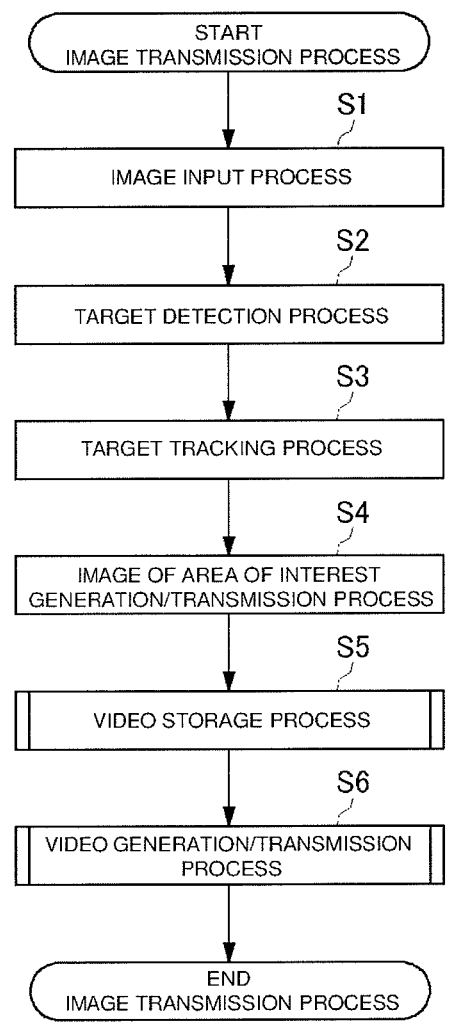
FIG. 5 is a flow diagram for describing operation of the video transmission apparatus according to the first embodiment of the present invention.

FIG. 5 is a flow diagram for describing operation of the video transmission apparatus 100 according to the present embodiment. As shown in FIG. 5, in a transmission process of image/video executed by the video transmission apparatus 100, moving images (a plurality of consecutive images) obtained by imaging the monitoring area are first input to the image input unit 102 (S1). Next, the input images are analyzed, and a target object (such as face, person, number plate, clothes, and shoes) is detected (S2). Consequently, a process of tracking the detected target object and associating the target object in the time direction is executed, and based on the associated result, information of the existence time from the appearance to the disappearance of the target object is stored in the track information storage unit 107 along with an ID of the target object (S3). A spatio-temporal analysis is performed based on the results of the target detection process (S2) and the target tracking process (S3), best-shot images are selected, the data volume is reduced to generate data volume reduced images, and the data volume reduced images are transmitted to the video reception apparatus 200 (S4).

Figure 6:
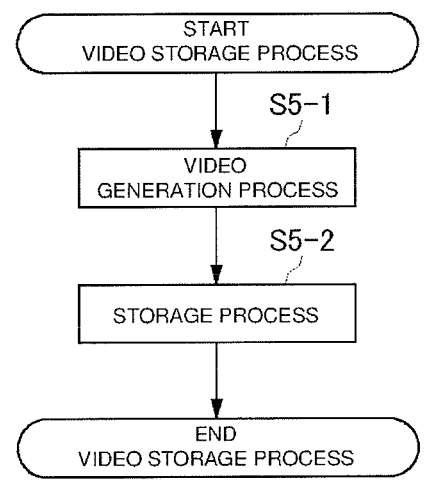
FIG. 6 is a flow diagram of a video storage process according to the first embodiment of the present invention.

Subsequently, the input images are stored in the video storage unit 109 (or in a storage unit outside of the apparatus) in the video transmission apparatus 100 (S5). In this case, as shown in a flow diagram of FIG. 6, the image quality of a face area or a person area may be improved to generate a video (video to be stored) based on the results of the detection process (S2) and the target tracking process (S3) (S5-1), and then the video may be stored in the video storage unit 109 (or in a storage unit outside of the apparatus) (S5-2).

Figure 7:
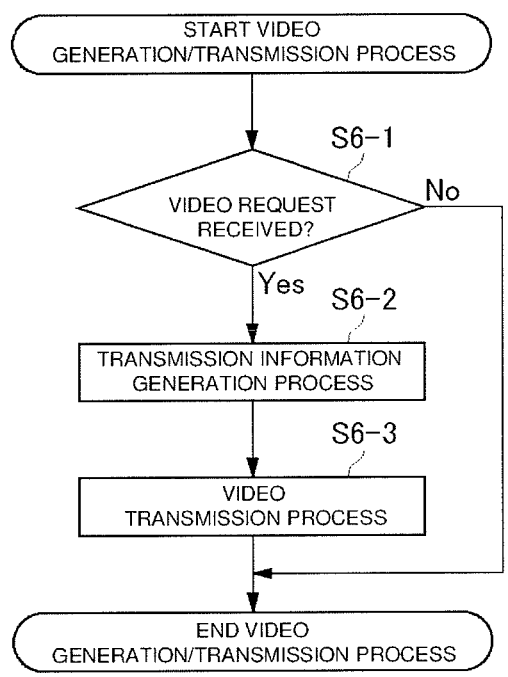
FIG. 7 is a flow diagram of a generation/transmission process of the monitoring video according to the first embodiment of the present invention.

When a video request is received from the video reception apparatus 200, the video transmission apparatus 100 generates a monitoring video and transmits the monitoring video to the video reception apparatus 200 (S6). Specifically, as shown in a flow diagram of FIG. 7, the video transmission apparatus 100 determines whether a video request is received from the video reception apparatus 200 (S6-1). If a video request is received, the video transmission apparatus 100 generates a monitoring video of the target object (video from the appearance to the disappearance of the target object) based on the information of the existence time of the target object (S6-2) and transmits the monitoring video to the video reception apparatus 200 (S6-3).

Next, operation of the entire video monitoring system will be described with reference to a sequence diagram of FIG. 8.

Figure 8:
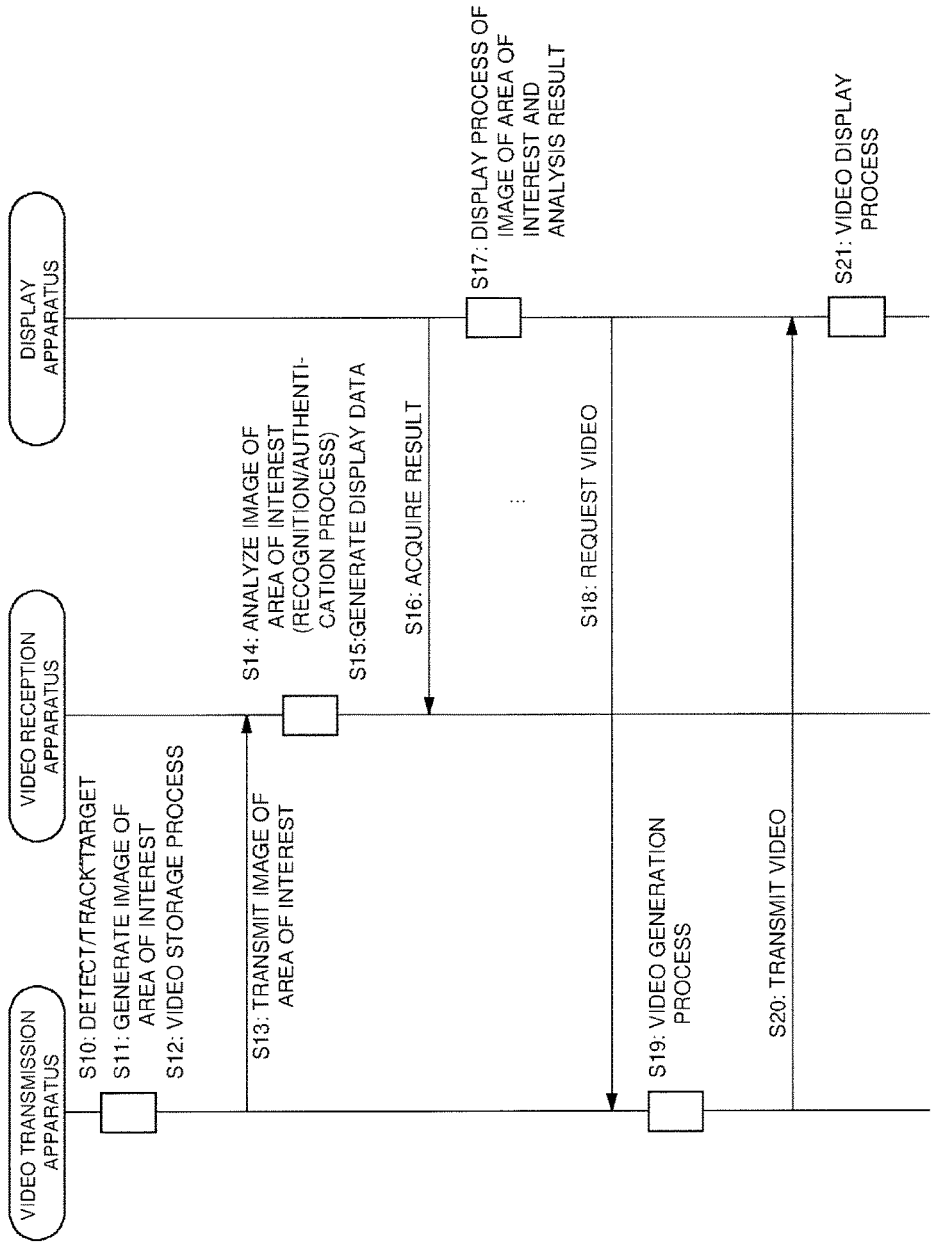
FIG. 8 is a sequence diagram for describing operation of the video monitoring system according to the first embodiment of the present invention.

As shown in FIG. 8, in a transmission process of image/video in the video monitoring system, the video transmission apparatus 100 first executes a detection process and a tracking process of a target object (S10), generates data volume reduced images of an area of interest (S11), and executes a process of storing input moving images (S12). When the video transmission apparatus 100 transmits the data volume reduced images of the area of interest to the video reception apparatus 200 (S13), the video reception apparatus 200 executes an image analysis process (recognition/authentication process) of the area of interest (S14) and generates display data (S15).

When the display apparatus 300 acquires the analysis result (S16), the display apparatus 300 executes a process of displaying the data volume reduced images of the area of interest and the analysis result (S17). When the user who views the analysis result wants to see the monitoring video of the target object in detail (such as a video of the whole body and a video of actions), a video request for requesting the video of the target object (monitoring video) is transmitted to the video transmission apparatus 100 based on user input (S18).

When the video transmission apparatus 100 receives the video request, the video transmission apparatus 100 generates a monitoring video of the target object (video from the appearance to the disappearance of the target object) (S19) and transmits the monitoring video to the display apparatus 300 (S20). The display apparatus 300 displays the monitoring video (S21). In this way, the image/video of the target object to be monitored is transmitted in the video monitoring system.

According to the video monitoring system of the first embodiment, the transmission volume of the network NW can be reduced, and the storage volume of the video reception apparatus 200 can be reduced. Furthermore, a situation in which a necessary video is not transmitted and an unnecessary video is transmitted can be prevented.

More specifically, when a plurality of consecutive images obtained by imaging a monitoring area are input to the video transmission apparatus 100, the target object to be monitored is detected from the plurality of images in the present embodiment. In this case, the video transmission apparatus 100 tracks the target object and obtains the existence time from the appearance to the disappearance of the target object. The video transmission apparatus 100 selects one of the images in which the target object is detected and reduces the data volume. The video transmission apparatus 100 generates a data volume reduced image (for example, thumbnail image) of the target object and transmits the data volume reduced image to the video reception apparatus 200. The video reception apparatus 200 analyzes the data volume reduced image of the target object. When a video request of the target object is transmitted to the video transmission apparatus 100 according to the analysis result (for example, when the user wants to check the video in detail or when the video reception apparatus or the display apparatus determines to use and analyze a detailed video), the video transmission apparatus 100 generates a monitoring video of the target object (a plurality of consecutive images from the appearance to the disappearance of the target object) based on the existence time of the target object and transmits the monitoring video to the video reception apparatus 200.

According to the present embodiment, the video transmission apparatus 100 first transmits the data volume reduced image to the video reception apparatus 200 and transmits the monitoring video of the target object only when a video request is made according to the analysis result of the data volume reduced image. This can reduce the transmission volume of the network NW and reduce the storage volume of the video reception apparatus 200. In this case, the monitoring video is a video (a plurality of consecutive images) from the appearance to the disappearance of the target object. This can prevent a situation in which a necessary video is not transmitted and an unnecessary video is transmitted.

Second Embodiment

Next, a video monitoring system according to a second embodiment of the present invention will be described. Differences between the video monitoring system of the second embodiment and the video monitoring system of the first embodiment will be mainly described here. The configuration and operation of the present embodiment are the same as those of the first embodiment unless otherwise specifically stated here.

Figure 9:
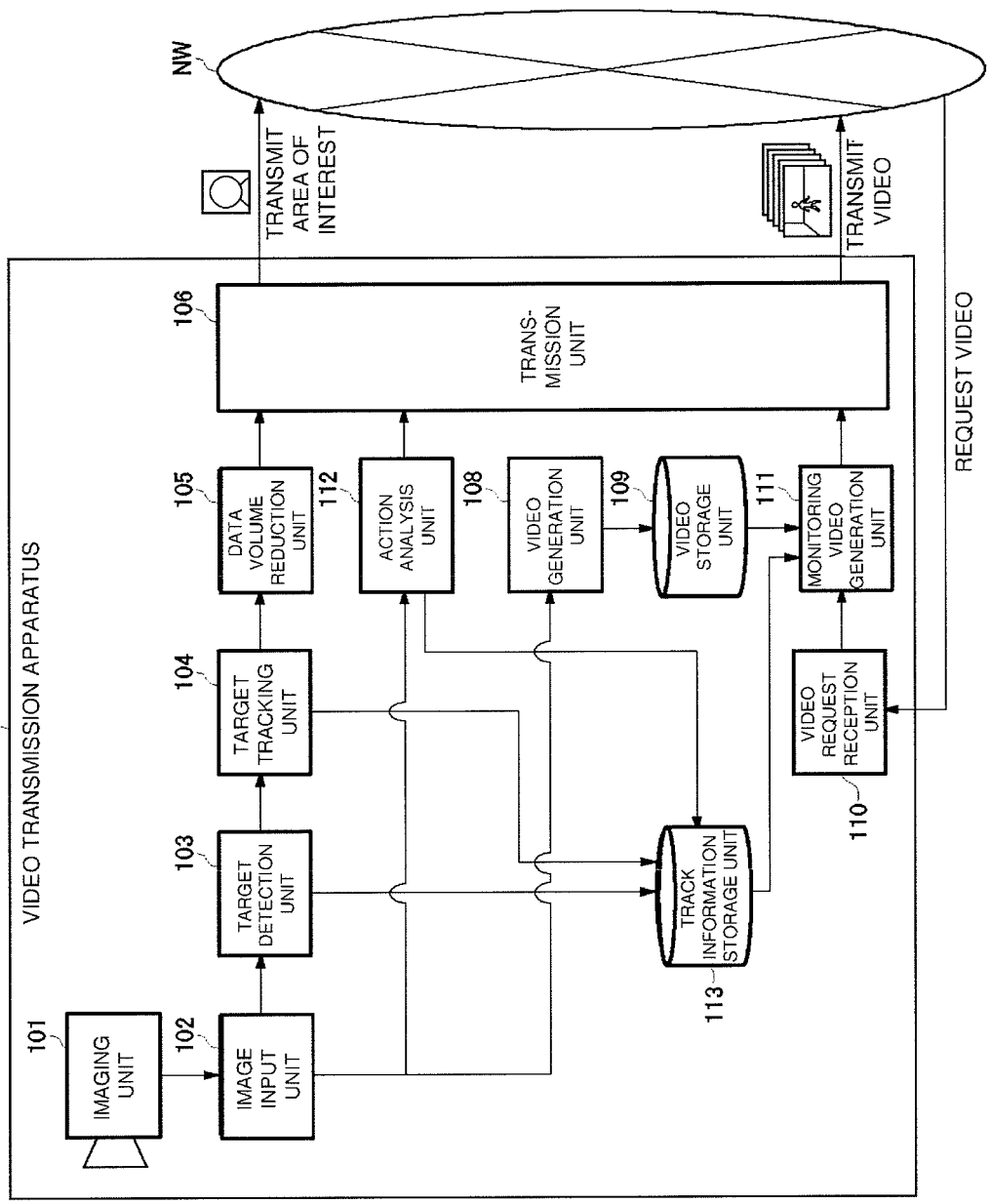
FIG. 9 is a block diagram of the video transmission apparatus of a video monitoring system according to a second embodiment of the present invention.

FIG. 9 is a block diagram showing a configuration of the video transmission apparatus according to the present embodiment. As shown in FIG. 9, the video transmission apparatus 100 of the present embodiment includes an action analysis unit 112. The action analysis unit 112 has a function of detecting an action of the target object to be monitored from the plurality of images input to the image input unit 102 and obtaining monitoring action time from the start to the end of the action to be monitored, when the action to be monitored is designated in the video reception apparatus 200.

The information of the monitoring action time is stored in the analysis information storage unit 113. The information of the target object detected by the target detection unit 103 and the information of the existence time of the target object obtained by the target tracking unit 104 are also stored in the analysis information storage unit 113. Based on the monitoring action time stored in the analysis information storage unit 113, the monitoring video generation unit 111 generates a monitoring video including a plurality of consecutive images from the start to the end of the action of the target object to be monitored.

The same effects as those of the first embodiment are attained according to the video monitoring system of the second embodiment.

In addition, when an action to be monitored (for example, suspicion of shoplifting) is designated in the video reception apparatus 200 in the present embodiment, the video transmission apparatus 100 detects the action of the target object to be monitored and obtains the monitoring action time from the start to the end of the action to be monitored. The video transmission apparatus 100 generates the monitoring video of the target object (a plurality of consecutive images from the start to the end of the action to be monitored) based on the monitoring action time and transmits the monitoring video to the video reception apparatus 200. As a result, only the monitoring video related to the action to be monitored can be easily checked.

Third Embodiment

Next, a video monitoring system according to a third embodiment of the present invention will be described. Differences between the video monitoring system of the third embodiment and the video monitoring system of the first embodiment will be mainly described here. The configuration and operation of the present embodiment are the same as those of the first embodiment unless otherwise specifically stated here.

Figure 10:
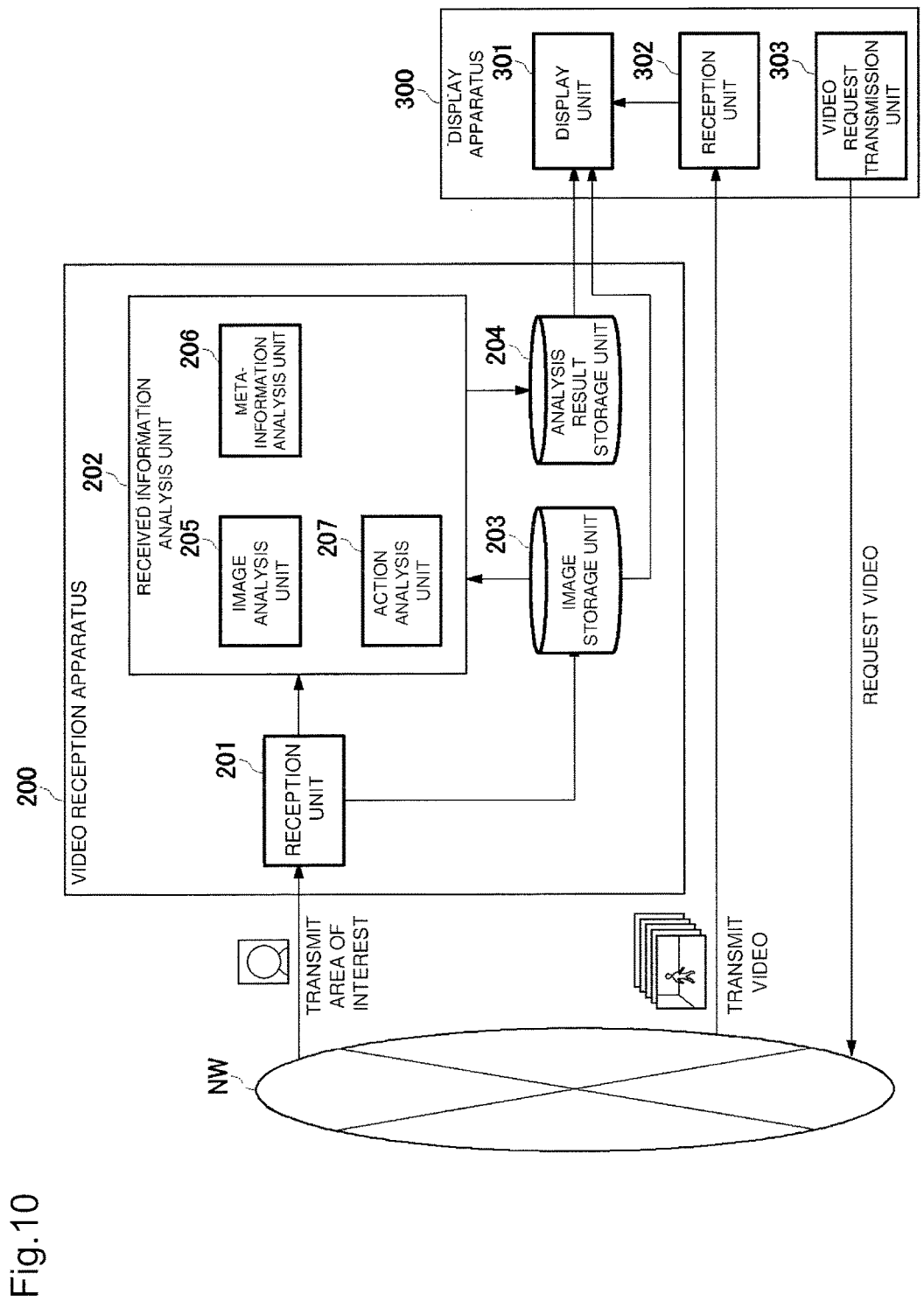
FIG. 10 is a block diagram of the video reception apparatus of a video monitoring system according to a third embodiment of the present invention.

FIG. 10 is a block diagram showing a configuration of the video reception apparatus according to the present embodiment. As shown in FIG. 10, the video reception apparatus 200 according to the present embodiment includes an action analysis unit 207. The action analysis unit 207 has a function of obtaining monitoring action time from the start to the end of an action to be monitored based on the data volume reduced images of the area of interest and the attached information of the data volume reduced images. In this case, the information of the monitoring action time can be included in the video request to transmit, to the video transmission apparatus 100, the monitoring video from the start to the end of the action of the target object to be monitored.

The same effects as those of the first embodiment are attained according to the video monitoring system of the third embodiment.

In addition, when an action to be monitored (for example, suspicion of shoplifting) is designated in the video reception apparatus 200 in the present embodiment, the video reception apparatus 200 obtains the monitoring action time from the start to the end of the action of the target object to be monitored. The video transmission apparatus 100 generates the monitoring video of the target object (a plurality of consecutive images from the start to the end of the action to the monitored) based on the information of the monitoring action time included in the video request and transmits the monitoring video to the video reception apparatus 200. As a result, only the monitoring video related to the action to be monitored can be easily checked.

Fourth Embodiment

Next, a video monitoring system according to a fourth embodiment of the present invention will be described. Differences between the video monitoring system of the fourth embodiment and the video monitoring system of the first embodiment will be mainly described here. The configuration and operation of the present embodiment are the same as those of the first embodiment unless otherwise specifically stated here.

Figure 11:
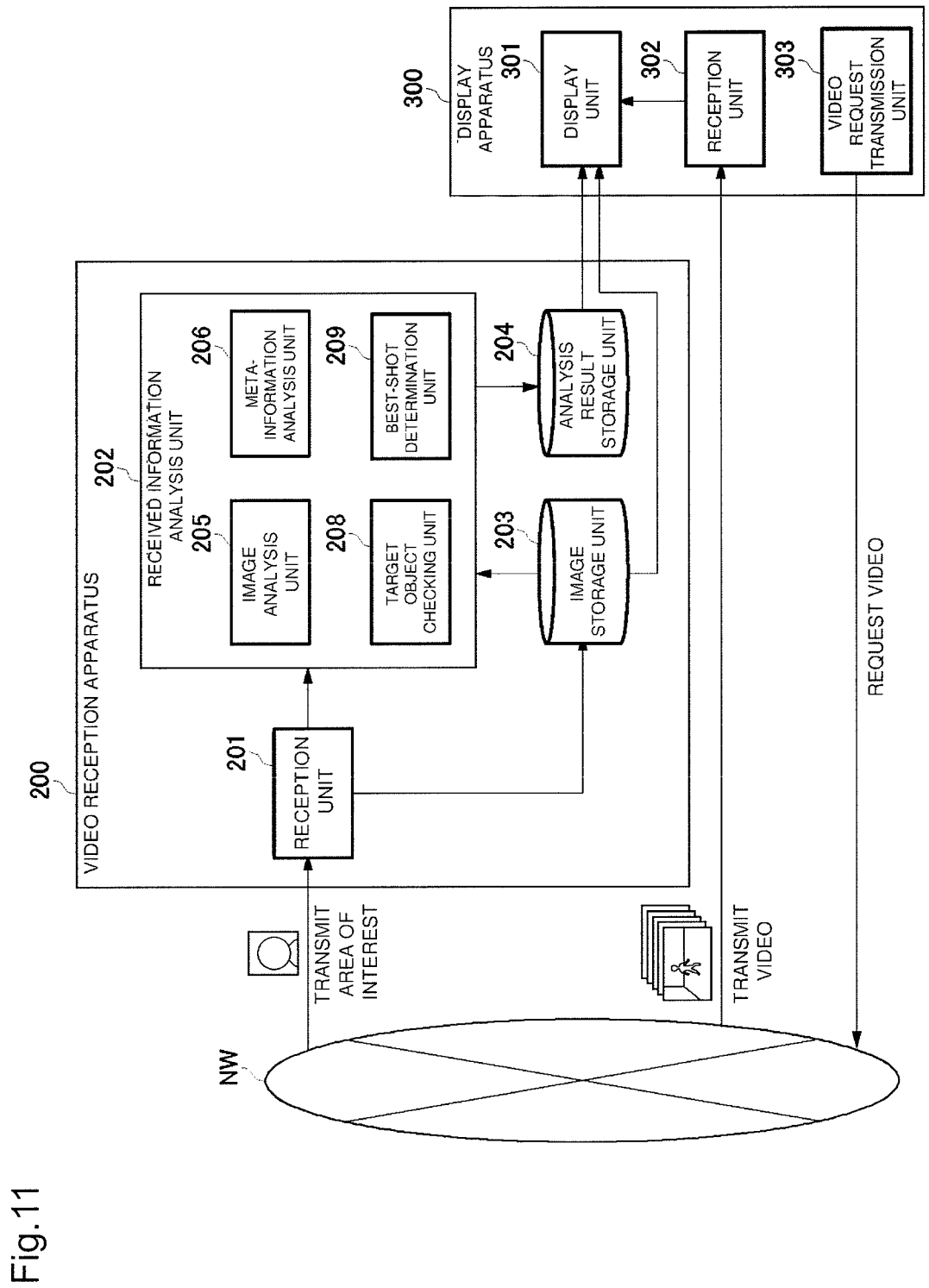
FIG. 11 is a block diagram of the video reception apparatus of a video monitoring system according to a fourth embodiment of the present invention.

FIG. 11 is a block diagram showing a configuration of the video reception apparatus according to the present embodiment. As shown in FIG. 11, the video reception apparatus 200 of the present embodiment includes a target object checking unit 208 and a best-shot determination unit 209. In the present embodiment, a plurality of video transmission apparatuses 100 (for example, video transmission apparatuses A to Z) are installed in one monitoring area. Images obtained by imaging one monitoring area from different positions and angles are input to the video transmission apparatuses 100.

The target object checking unit 208 performs an analysis (recognition/authentication process, metadata analysis) based on the plurality of data volume reduced images received from the plurality of video transmission apparatuses 100 and based on the attached information of the data volume reduced images (such as appearance/disappearance time, frame coordinates, and size) and checks whether the target objects of the plurality of data volume reduced images are the same person. The best-shot determination unit 209 selects a best-shot image (representative image) from the plurality of data volume reduced images if the target objects are determined to be the same person as a result of the check by the target object checking unit 208. In this case, it is desirable to select an image of the person facing front, an image not out of focus, an image with open eyes, or the like as the best-shot image, from the viewpoint of the visibility and the accuracy of the recognition authentication process.

Operation of the video monitoring system with the configuration described above will be described with reference to a sequence diagram of FIG. 12.

Figure 12:
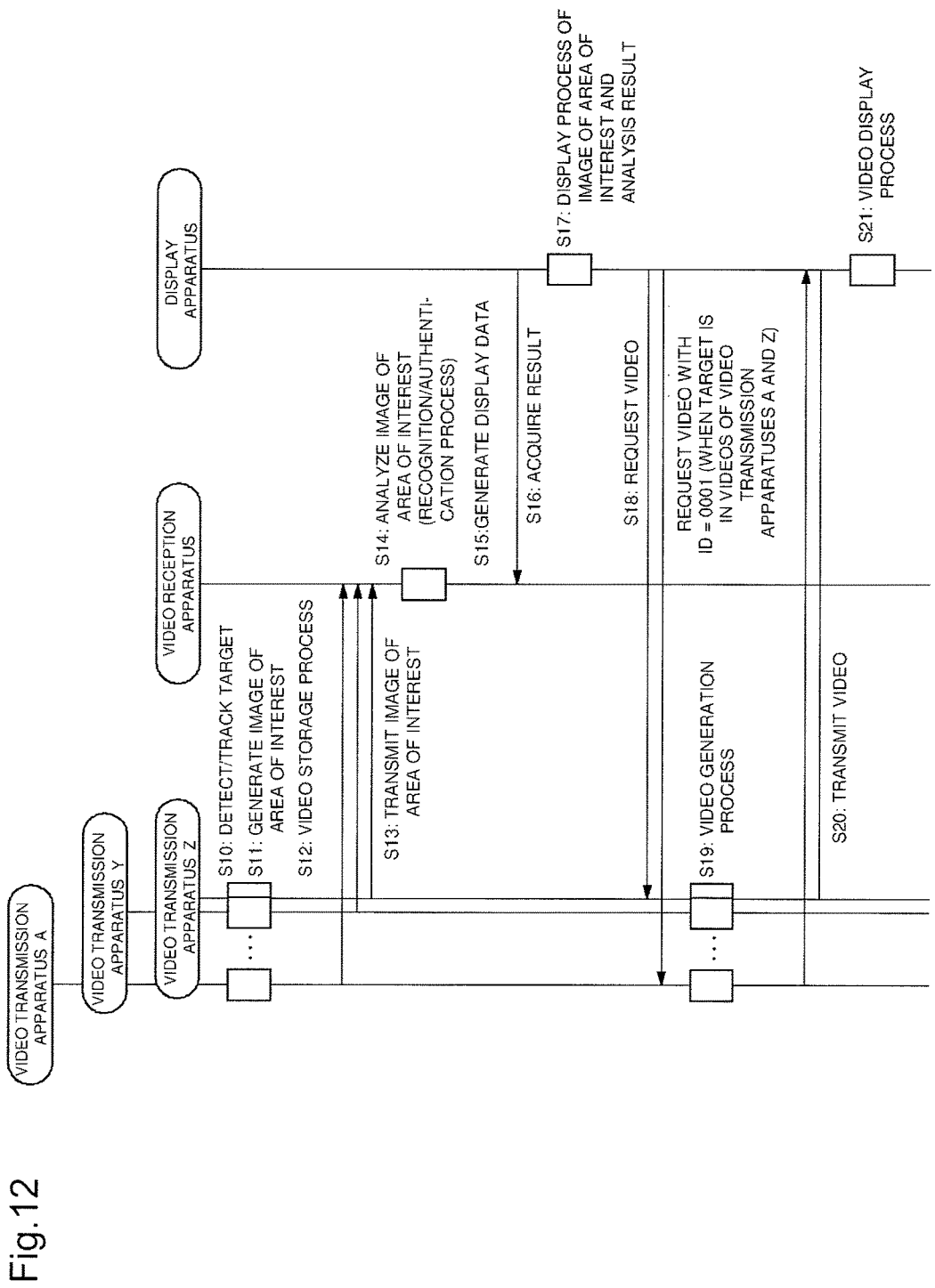
FIG. 12 is a sequence diagram for describing operation of the video monitoring system according to the fourth embodiment of the present invention.

As shown in FIG. 12, when a transmission process of image/video is executed in the video monitoring system of the present embodiment, a plurality of video transmission apparatuses 100 (video transmission apparatuses A to Z) execute detection processes and tracking processes of the target object (S10), generate data volume reduced images of the area of interest (S11) and execute processes of storing the input moving images (S12). When the video transmission apparatuses 100 transmit the data volume reduced images of the area of interest to the video reception apparatus 200 (S13), the video reception apparatus 200 executes an image analysis process (recognition/authentication process) of the area of interest (S14) and generates display data (S15).

When the display apparatus 300 acquires the analysis result (S16), the display apparatus 300 executes a process of displaying the data volume reduced images of the area of interest and the analysis result (S17). When the user who views the analysis result wants to see the monitoring video of the target object in detail (such as a video of the whole body and a video of actions), a video request for requesting videos of the target object (monitoring videos) is transmitted to the video transmission apparatuses 100 based on user input (S18). In this case, the video request is transmitted to the video transmission apparatuses 100 (for example the video transmission apparatuses A and Z) with the videos of the target object.

The video transmission apparatuses 100 (video transmission apparatuses A and Z) that have received the video request generate monitoring videos of the target object (videos from the appearance to the disappearance of the target object) (S19) and transmit the monitoring videos to the display apparatus 300 (S20). The display apparatus 300 displays the monitoring videos (S21). In this way, the images/videos of the target object to be monitored are transmitted in the video monitoring system.

The same effects as those of the first embodiment are attained according to the video monitoring system of the fourth embodiment.

In addition, a plurality of video transmission apparatuses 100 (video transmission apparatuses A to Z) are installed in one monitoring area in the present embodiment, and images obtained by imaging the monitoring area from different angles are input to the video transmission apparatuses 100. The video reception apparatus 200 analyzes a plurality of data volume reduced images received from the video transmission apparatuses 100 and checks whether the target objects of the data volume reduced images are the same person. If the target objects are determined to be the same person as a result of the check, a best-shot image is selected from the plurality of data volume reduced images. In this way, when a plurality of video transmission apparatuses 100 are installed in one monitoring area, the best-shot image can be used to comprehensively manage the target objects appeared in the monitoring area.

Fifth Embodiment

Next, a video monitoring system according to a fifth embodiment of the present invention will be described. Differences between the video monitoring system of the fifth embodiment and the video monitoring system of the fourth embodiment will be mainly described here. The configuration and operation of the present embodiment are the same as those of the fourth embodiment unless otherwise specifically stated here.

In the present embodiment, a plurality of video transmission apparatuses (for example, video transmission apparatuses A and B) are installed to monitor an exit/entrance area of a shop such as a convenience store. For example, the video transmission apparatus A is installed at a position that allows imaging a person entering the shop, and the video transmission apparatus B is installed at a position that allows imaging a person leaving the shop. In this case, the object to be monitored by the video transmission apparatus A is a person entering the shop (person coming in to the shop), and the object to be monitored by the video transmission apparatus B is a person leaving the shop (person going out of the shop).

The reception unit 201 of the video reception apparatus 200 has a function of receiving appearance time of the target object of the video transmission apparatus A (person entering the shop) from the video transmission apparatus A and a function of receiving disappearance time of the target object of the video transmission apparatus B (person leaving the shop) from the video transmission apparatus B. The target object checking unit 208 has a function of analyzing the data volume reduced images received from the video transmission apparatus A and the video transmission apparatus B and checking whether the target object of the video transmission apparatus A (person entering the shop) and the target object of the video transmission apparatus B (person leaving the shop) are the same person.

The received information analysis unit 202 has a function of obtaining shop stay time of the target object (customer) which is time from the appearance time of the target object of the video transmission apparatus A (person entering the shop) to the disappearance time of the target object of the video transmission apparatus B (person leaving the shop) if the target objects are determined to be the target person as a result of the check by the target object checking unit 208. In the present embodiment, the best-shot determination unit 209 may not necessarily be provided.

According to the present embodiment, an exit/entrance area of a shop can be monitored. As described, in this case, the video transmission apparatus A is installed at a position that allows imaging a person entering the shop, and the video transmission apparatus B is installed at a position that allows imaging a person leaving the shop. Whether the target object of the video transmission apparatus A (person entering the shop) and the target object of the video transmission apparatus B (person leaving the shop) are the same person is checked. If the target objects are determined to be the same person, the time from the appearance time of the target object of the video transmission apparatus A to the disappearance time of the target object of the video transmission apparatus B is obtained as the shop stay time of the target object (customer). In this way, the shop stay time of the target object (customer) can be obtained.

Sixth Embodiment

Next, a video monitoring system according to a sixth embodiment of the present invention will be described. Differences between the video monitoring system of the sixth embodiment and the video monitoring system of the fourth embodiment will be mainly described here. The configuration and operation of the present embodiment are the same as those of the fourth embodiment unless otherwise specifically stated here.

In the present embodiment, a plurality of video transmission apparatuses (for example, video transmission apparatuses A, B, and C) are installed to monitor a drive-through shop area. For example, the video transmission apparatus A is installed at a position that allows imaging an entrance point of the shop area, the video transmission apparatus B is installed at a position that allows imaging an ordering point in the shop area, and the video transmission apparatus C is installed at a position that allows imaging a delivery point in the shop area. In this case, the target object to be monitored by the video transmission apparatuses A, B, and C is a vehicle or a driver of the vehicle passing through the shop area. Although the number plate can be specifically checked to monitor the vehicle, the arrangement is not limited to this.

The reception unit 201 of the video reception apparatus 200 has a function of receiving appearance time of the target object (vehicle or driver) from the video transmission apparatus A and the video transmission apparatus B and a function of receiving disappearance time of the target object (vehicle or driver) from the video transmission apparatus B and the video transmission apparatus C. The target object checking unit 208 has a function of analyzing data volume reduced images received from the video transmission apparatus A, the video transmission apparatus B, and the video transmission apparatus C and checking whether the target object (vehicle or driver) of the video transmission apparatus A, the target object (vehicle or driver) of the video transmission apparatus B, and the target object (vehicle or driver) of the video transmission apparatus C are the same vehicle or the same person.

The received information analysis unit 202 has a function of obtaining time from entering the shop area to ordering, which is time from the appearance time of the target object (vehicle or driver) of the video transmission apparatus A to the disappearance time of the target object (vehicle or driver) of the video transmission apparatus B, and obtaining time from ordering to delivery in the shop area, which is time from the appearance time of the target object (vehicle or driver) of the video transmission apparatus B to the disappearance time of the target object (vehicle or driver) of the video transmission apparatus C, if the target objects are determined to be the same vehicle or the same person as a result of the check by the target object checking unit 208. In the present embodiment, the best-shop determination unit 209 may not necessarily be provided.

According to the present embodiment, a drive-through shop area can be monitored. As described, in this case, the video transmission apparatus A is installed at a position that allows imaging the entrance point in the shop area, the video transmission apparatus B is installed at a position that allows imaging the ordering point in the shop area, and the video transmission apparatus C is installed at a position that allows imaging the delivery point in the shop area. Whether the target object (vehicle or driver) of the video transmission apparatus A, the target object (vehicle or driver) of the video transmission apparatus B, and the target object (vehicle or driver) of the video transmission apparatus C are the same vehicle or the same person is checked. If the target objects are determined to be the same vehicle or the same person, the time from the appearance time of the target object (vehicle or driver) of the video transmission apparatus A to the disappearance time of the target object (vehicle or driver) of the video transmission apparatus B is obtained as the time from entering the shop area to ordering, and the time from the appearance time of the target object (vehicle or driver) of the video transmission apparatus B to the disappearance time of the target object (vehicle or driver) of the video transmission apparatus C is obtained as the time from ordering to delivery in the shop area. In this way, the time from the monitoring target (vehicle or driver) entering the drive-through shop area to ordering and the time from ordering to delivery can be obtained.

Although the embodiments of the present invention have been described by illustration, the scope of the present invention is not limited to these, and changes and modifications can be made within the scope of the claims in accordance with objects.

For example, the video monitoring system may include one video transmission apparatus 100, one video reception apparatus 200, and one display apparatus 300 as shown in FIG. 13(*a*). The video monitoring system may include a plurality of video transmission apparatuses 100, a plurality of video reception apparatuses 200, and a plurality of display apparatuses 300 as shown in FIG. 13(*c*). The video reception apparatus 200 and the display apparatus 300 may form one apparatus as shown in FIGS. 13(*b*) and 13(*d*).

As shown in FIGS. 14 and 15, for example, the video transmission apparatus 100 may manage a data set A (identification ID, type, and time information), may manage a data set B (identification ID and type), or may manage the data set A (identification ID, type, and time information) and a data set C (identification ID, type of action of interest, and time information).

Furthermore, for example, the attached information (meta-information) transmitted from the video transmission apparatus 100 to the video reception apparatus 200 may include the data set A (identification ID, type, and time information), may include the data set B (identification ID and type), may include the data set A (identification ID, type, and time information) and the data set C (identification ID, type of action of interest, and time information), or may include the data set B (identification ID and type) and a data set D (identification ID and type of action of interest).

Furthermore, for example, the data requested to the video transmission apparatus 100 in the video request may include the data set A (identification ID, type, and time information), may include the data set B (identification ID and type), may include the data set C (identification ID, type of action of interest, and time information), and may include the data set D (identification ID and type of action of interest). The video transmission apparatus and the video reception apparatus may be connected not through the network, and the imaging unit (camera) may be separated from the video transmission apparatus. In that case, a plurality of imaging units (cameras) may be connected to one video transmission apparatus to transmit images.

Although preferred embodiments of the present invention that can be considered at the moment have been described, it will be understood that various modifications are possible for the present embodiments, and it is intended that the appended claims include all such modifications within the true spirit and scope of the present invention.

INDUSTRIAL APPLICABILITY

As described, the video monitoring system according to the present invention have effects of not only reducing the transmission volume of the network and reducing the storage volume of the video reception apparatus, but also preventing a situation in which a necessary video is not transmitted and an unnecessary video is transmitted. The video monitoring system is used as a system of using a video to monitor a monitoring area of a facility, a building, and the like and is useful.

REFERENCE SIGNS LIST 100 video transmission apparatus
101 imaging unit
102 image input unit
103 target detection unit
104 target tracking unit
105 data volume reduction unit
106 transmission unit
107 track information storage unit
108 video generation unit
109 video storage unit
110 video request reception unit
111 monitoring video generation unit
112 action analysis unit
113 analysis information storage unit
200 video reception apparatus
201 reception unit
202 received information analysis unit
203 image storage unit
204 analysis result storage unit
205 image analysis unit
206 meta-information analysis unit
207 action analysis unit
208 target object checking unit
209 best-shot determination unit
300 display apparatus
301 display unit
302 reception unit
303 video request transmission unit
NW network

The invention claimed is:

1. A video monitoring system comprising a video transmission apparatus and a video reception apparatus,
the video transmission apparatus including at least one program which causes the video transmission apparatus to perform functions comprising:
receiving a plurality of consecutive images obtained by imaging a monitoring area, the plurality of consecutive images being input to the video transmission apparatus;
detecting a target object to be monitored from the plurality of consecutive images;
tracking the target object detected by the detecting to obtain an existence time from an appearance to a disappearance of the target object in the monitoring area;
selecting an image, in which the target object is detected, from the plurality of consecutive images and reducing a data volume of the selected image to generate a data volume reduced image of the target object; and
transmitting the data volume reduced image to the video reception apparatus,
the video reception apparatus including at least one program which causes the video reception apparatus to perform functions comprising:
receiving the data volume reduced image transmitted from the video transmission apparatus;
analyzing the data volume reduced image; and
transmitting a video request that requests a plurality of consecutive images of the target object to the video transmission apparatus based on an input made according to an analysis result of the analyzing,
the video transmission apparatus further performing functions comprising:
storing the plurality of consecutive images input to the video transmission apparatus;
receiving the video request transmitted from the video reception apparatus;
generating a monitoring video of the target object including a plurality of consecutive images from the appearance to the disappearance of the target object based on the existence time of the target object when the the video request is received; and
transmitting the monitoring video to the video reception apparatus.

2. The video monitoring system according to claim 1, wherein
the functions performed by the video transmission apparatus further comprise:
analyzing an action of the target object from the plurality of consecutive images input to the video transmission apparatus to obtain a monitoring action time from a start to an end of the action; and
when an action to be monitored is designated in the video reception apparatus,
generating, as the monitoring video, a video including a plurality of consecutive images from the start to the end of the action of the target object to be monitored based on the monitoring action time.

3. The video monitoring system according to claim 1, wherein
a plurality of the video transmission apparatus is installed in one monitoring area, images obtained by imaging the monitoring area from different positions are input to the plurality of the video transmission apparatus, and
the functions performed by the video reception apparatus further comprise:
analyzing a plurality of data volume reduced images received from the plurality of the video transmission apparatus to check whether target objects of the plurality of data volume reduced images are a same person; and
selecting a best-shot image from the plurality of data volume reduced images when the target objects are determined to be the same person as a result of the check.

4. The video monitoring system according to claim 1, wherein
the monitoring area includes an exit/entrance area of a shop,
a plurality of the video transmission apparatus is installed to monitor the exit/entrance area of the shop,
the plurality of the video transmission apparatus includes a first video transmission apparatus installed at a first position that allows imaging of a person entering the shop and a second video transmission apparatus installed at a second position that allows imaging a person leaving the shop, the target object to be monitored by the first video transmission apparatus being the person entering the shop, the target object to be monitored by the second video transmission apparatus being the person leaving the shop,
the functions performed by the video reception apparatus further comprise:
receiving an appearance time of the target object of the first video transmission apparatus from the first video transmission apparatus;

receiving a disappearance time of the target object of the second video transmission apparatus from the second video transmission apparatus; and analyzing data volume reduced images received from the first video transmission apparatus and the second video transmission apparatus to check whether the target object of the first video transmission apparatus and the target object of the second video transmission apparatus are a same person, and the video reception apparatus obtains, as a shop stay time of the target object, a time from the appearance time of the target object of the first video transmission apparatus to the disappearance time of the target object of the second video transmission apparatus when the target objects are determined to be the same person as a result of the check.

5. The video monitoring system according to claim 1, wherein the monitoring area includes an exit/entrance area of a shop, a plurality of the video transmission apparatus is installed to monitor the exit/entrance area of the shop, the plurality of the video transmission apparatus includes a first video transmission apparatus installed at a first position that allows imaging an entrance point of the shop and a second video transmission apparatus installed at a second position that allows imaging an ordering point of the shop, the target object to be monitored by the first video transmission apparatus and the second video transmission apparatus being a person entering the shop, the functions performed by the video reception apparatus further comprise:

receiving an appearance time of the target object from the first video transmission apparatus;

receiving a disappearance time of the target object from the second video transmission apparatus; and analyzing data volume reduced images received from the first video transmission apparatus and the second video transmission apparatus to check whether the target object of the first video transmission apparatus and the target object of the second video transmission apparatus are a same person, and the video reception apparatus obtains, as a time from entering the shop area to ordering, a time from the appearance time of the target object of the first video transmission apparatus to the disappearance time of the target object of the second video transmission apparatus when the target objects are determined to be the same person as a result of the check.

6. The video monitoring system according to claim 1, wherein the monitoring area includes a drive-through shop area, a plurality of the video transmission apparatus is installed to monitor the drive-through shop area, the plurality of the video transmission apparatus includes a first video transmission apparatus installed at a first position that allows imaging an entrance point in the drive-through shop area, a second video transmission apparatus installed at a second position that allows imaging an ordering point in the drive-through shop area, and a third video transmission apparatus installed at a third position that allows imaging a delivery point in the drive-through shop area, the target object to be monitored by the first video transmission apparatus, the second video transmission apparatus, and the third video transmission apparatus is a vehicle or a driver of the vehicle passing through the drive-through shop area, the functions performed by the video reception apparatus further comprise:

receiving an appearance time of the target object from the first video transmission apparatus and the second video transmission apparatus;

receiving a disappearance time of the target object from the second video transmission apparatus and the third video transmission apparatus; and analyzing data volume reduced images received from the first video transmission apparatus, the second video transmission apparatus, and the third video transmission apparatus to check whether the target object of the first video transmission apparatus, the target object of the second video transmission apparatus, and the target object of the third video transmission apparatus are a same vehicle or a same person, and the video reception apparatus obtains, as a time from entering the drive-through shop area to ordering, a time from the appearance time of the target object of the first video transmission apparatus to the disappearance time of the target object of the second video transmission apparatus and obtains, as a time from ordering to delivery in the drive-through shop area, a time from the appearance time of the target object of the second video transmission apparatus to the disappearance time of the target object of the third video transmission apparatus when the target objects are determined to be the same vehicle or the same person as a result of the check.

7. The video monitoring system according to claim 1, wherein the monitoring area includes a drive-through shop area, a plurality of the video transmission apparatus is installed to monitor the drive-through shop area, the plurality of the video transmission apparatus includes a first video transmission apparatus installed at a first position that allows imaging an ordering point in the drive-through shop area and a second video transmission apparatus installed at a second position that allows imaging a delivery point in the drive-through shop area, the target object to be monitored by the first video transmission apparatus and the second video transmission apparatus is a vehicle or a driver of the vehicle passing through the drive-through shop area, the functions performed by the video reception apparatus further comprise:

receiving an appearance time of the target object from the first video transmission apparatus;

receiving a disappearance time of the target object from the second video transmission apparatus; and analyzing data volume reduced images received from the first video transmission apparatus and the second video transmission apparatus to check whether the target object of the first video transmission apparatus and the target object of the second video transmission apparatus are a same vehicle or a same person, and the video reception apparatus obtains, as a time from ordering to delivery in the drive-through shop area, a time from the appearance time of the target object of the first video transmission apparatus to the disappearance time of the target object of the second video transmission apparatus when the target objects are determined to be the same vehicle or the same person as a result of the check.

8. A video monitoring method where monitoring is conducted by using a received video, the video monitoring method comprising:
 storing a plurality of consecutive images obtained by imaging the monitoring area and detecting a target object to be monitored from the plurality of consecutive images;
 obtaining an existence time from an appearance to a disappearance of the target object in the monitoring area;
 selecting an image, in which the target object is detected, from the plurality of consecutive images and reducing a data volume of the selected image to generate a data volume reduced image of the target object; and
 transmitting the data volume reduced image, in which the target object is detected, to a reception side that monitors the data volume reduced image, wherein
 in the reception side,
 the data volume reduced image, in which the target object is detected, is analyzed,
 a video request for requesting a plurality of consecutive images of the target object is transmitted to a transmission side based on an input made according to a result of the analysis, and
 in the transmission side,
 a monitoring video of the target object including a plurality of consecutive images from the appearance to the disappearance of the target object is generated from the stored images based on the existence time of the target object when the video request is received, and
 the monitoring video is transmitted to the reception side.

9. The video monitoring method according to claim 8, further comprising:
 analyzing an action of the target object from the plurality of consecutive images to obtain a monitoring action time from a start to an end of the action; and
 generating, as the monitoring video, a video including a plurality of consecutive images from the start to the end of the action of the target object to be monitored from the plurality of consecutive images based on the monitoring action time of the action to be monitored, the action to be monitored being designated in the reception side.

10. The video monitoring method according to claim 8, wherein
 the monitoring area includes an exit/entrance area of a shop,
 target objects to be monitored include a person entering the shop and a person leaving the shop, and
 in the reception side,
 an appearance time of the person entering the shop and a disappearance time of the person leaving the shop are received as an existence time from an appearance to a disappearance of the target objects in the monitoring area,
 whether the person entering the shop and the person leaving the shop are a same person is checked from received data volume reduced images in which the target objects are detected, and
 a time from the appearance time of the person entering the shop to the disappearance time of the person leaving the shop is obtained as a shop stay time of the person entering the shop when the person entering the shop and the person leaving the shop are determined to be the same person as a result of the check.

11. The video monitoring method according to claim 8, wherein
 the monitoring area includes an exit/entrance area of a shop,
 target objects to be monitored include a person entering the shop and a person ordering in the shop, and
 in the reception side,
 an appearance time of the person entering the shop and a disappearance time of the person ordering in the shop are received as an existence time from an appearance to a disappearance of the target objects in the monitoring area,
 whether the person entering the shop and the person ordering in the shop are a same person is checked from received data volume reduced images in which the target objects are detected, and
 a time from the appearance time of the person entering the shop to the disappearance time of the person ordering in the shop is obtained as a time from entering the shop area to ordering when the target objects are determined to be the same person as a result of the check.

12. The video monitoring method according to claim 8, wherein
 the monitoring area includes a drive-through shop area,
 target objects to be monitored include a vehicle or a driver of the vehicle passing through an entrance point, an ordering point, and a delivery point of the drive-through shop area, and
 in the reception side,
 an appearance time of the vehicle or the driver at the entrance point and the ordering point and a disappearance time of the vehicle or the driver at the ordering point and the delivery point are received as an existence time from an appearance to a disappearance of the target objects in the monitoring area,
 whether the vehicle or the driver at the entrance point, the vehicle or the driver at the ordering point, and the vehicle or the driver at the delivery point are a same vehicle or a same person is checked from received data volume reduced images in which the target objects are detected, and
 when the target objects are determined to be the same vehicle or the same person as a result of the check, a time from the appearance time of the vehicle or the driver at the entrance point to the disappearance time of the vehicle or the driver at the ordering point is obtained as a time from entering the drive-through shop area to ordering, and a time from the appearance time of the vehicle or the driver at the ordering point to the disappearance time of the vehicle or the driver at the delivery point is obtained as a time from ordering to delivery in the drive-through shop area.

13. The video monitoring method according to claim 8, wherein
 the monitoring area includes a drive-through shop area,
 target objects to be monitored include a vehicle or a driver of the vehicle passing through an ordering point and a delivery point in the drive-through shop area, and
 in the reception side,
 an appearance time of the vehicle or the driver of the vehicle passing through the ordering point and a disappearance time of the vehicle or the driver of the vehicle passing through the delivery point are received as an existence time from an appearance to a disappearance of the target objects in the monitoring area, whether the vehicle or the driver of the vehicle at the ordering point and the vehicle or the driver of the vehicle at the delivery point are a same vehicle or a same person is checked from received data volume reduced images in which the target objects are detected, and a time from the appearance time of the vehicle or the driver of the vehicle at the ordering point to the disappearance time of the vehicle or the driver of the vehicle at the delivery point is obtained as a time from ordering to delivery at the drive-through shop area when the target objects are determined to be the same vehicle or the same person as a result of the check.

14. A video transmission apparatus connected to a video reception apparatus in a video monitoring system, the video transmission apparatus comprising:

an image input to which a plurality of consecutive images obtained by imaging a monitoring area are input;

a target detector that detects a target object to be monitored from the plurality of consecutive images input to the image input;

an existence time detector that obtains an existence time from an appearance to a disappearance of the target object in the monitoring area;

a data volume reducer that selects an image, in which the target object is detected, from the plurality of consecutive images input to the image input and that reduces a data volume of the selected image to generate a data volume reduced image of the target object;

an image transmitter that transmits the data volume reduced image to the video reception apparatus, a request receiver that receives a video request transmitted from the video reception apparatus;

a monitoring video generator that generates a monitoring video of the target object including a plurality of consecutive images from the appearance to the disappearance of the target object based on the existence time of the target object when the request receiver receives the video request; and a video transmitter that transmits the monitoring video to the video reception apparatus.

15. A non-transitory computer-readable medium including a program executed by a video transmission apparatus connected to a video reception apparatus in a video monitoring system, the program causing a computer to execute processes comprising:

receiving a plurality of consecutive images obtained by imaging a monitoring area, the plurality of consecutive images being input to the video transmission apparatus;

detecting a target object to be monitored from the plurality of consecutive images;

obtaining an existence time from an appearance to a disappearance of the target object in the monitoring area;

selecting an image, in which the target object is detected, from the plurality of consecutive images and reducing a data volume of the selected image to generate a data volume reduced image of the target object;

transmitting the data volume reduced image to the video reception apparatus;

receiving a video request transmitted from the video reception apparatus;

generating a monitoring video of the target object including a plurality of consecutive images from the appearance to the disappearance of the target object based on the existence time of the target object when receiving the video request; and transmitting the monitoring video to the video reception apparatus.

16. The video monitoring system according to claim 1, wherein the video transmission apparatus trims or resizes the selected image to generate the data volume reduced image of the target object.

17. The video monitoring system according to claim 1, wherein the data volume reduced image includes a data volume reduced from the selected image for reducing a load on a transmission network between the video transmission apparatus and the video reception apparatus, for reducing a processing load of the video reception apparatus, and for reducing a required volume of a storage database.

18. The video monitoring system according to claim 1, wherein the data volume reduced image includes an area of interest of the target object, the area of interest including a face area of a person.

19. The video monitoring system according to claim 18, wherein the data volume reduced image is a thumbnail image of the area of interest.

20. The video monitoring system according to claim 1, wherein the video transmission apparatus improves an image quality of a face area or a person area of the target object before storing the plurality of consecutive images input to the video transmission apparatus.

* * * * *